United States Patent
Balasubramanian et al.

(10) Patent No.: US 12,500,709 B2
(45) Date of Patent: Dec. 16, 2025

(54) SIGNALING METHODS FOR SIDELINK POSITIONING FOR HETEROGENEOUS USER EQUIPMENTS

(71) Applicant: QUALCOMM Incorporated, San Diego, CA (US)

(72) Inventors: Anantharaman Balasubramanian, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/932,891

(22) Filed: Sep. 16, 2022

(65) Prior Publication Data

US 2024/0097837 A1     Mar. 21, 2024

(51) Int. Cl.
*H04L 5/00*     (2006.01)

(52) U.S. Cl.
CPC .......... *H04L 5/0035* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2014/0024378 A1 | 1/2014 | Khude et al. | |
| 2019/0313423 A1* | 10/2019 | Gupta | H04B 17/309 |
| 2020/0007247 A1* | 1/2020 | Gulati | H04L 1/0003 |
| 2022/0060450 A1* | 2/2022 | Slovetskiy | H04L 67/142 |
| 2022/0232474 A1 | 7/2022 | Xu et al. | |
| 2022/0236365 A1 | 7/2022 | Ko et al. | |
| 2022/0295514 A1 | 9/2022 | Shin et al. | |

(Continued)

FOREIGN PATENT DOCUMENTS

| | | |
|---|---|---|
| WO | 2021222624 A1 | 11/2021 |
| WO | 2022047741 A1 | 3/2022 |

OTHER PUBLICATIONS

3GPP TS 38.300: "3rd Generation Partnership Project, Technical Specification Group Radio Access Network, NR, NR and NG-RAN Overall Description, Stage 2 (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.1.0, Jul. 19, 2022, pp. 1-209, XP052183752, chapters 3.2, 5.22.6, 5.3.6, 5.7, 6.12, 8.4, 16.9, 16.12.

(Continued)

*Primary Examiner* — Adnan Baig
(74) *Attorney, Agent, or Firm* — Thien T. Nguyen

(57) ABSTRACT

In some implementations, a target user equipment (UE) may receive, from an initiator UE via an SL interface, a discovery request corresponding to an SL positioning session, wherein the target UE comprises a plurality of transmission/reception points (TRPs). The target UE may determine, from the discovery request, the initiator UE is incapable of associating each TRP of the plurality of TRPs with the target UE. Responsive to determining the initiator UE is incapable of associating each TRP of the plurality of TRPs with the target UE, the target UE may participate in the SL positioning session with the target UE by either: (i) using only one TRP of the plurality of TRPs during the SL positioning session, or (ii) using each TRP of the plurality of TRPs such that each TRP operates as a distinct UE.

14 Claims, 13 Drawing Sheets

(56) References Cited

U.S. PATENT DOCUMENTS

| | | | |
|---|---|---|---|
| 2022/0302994 A1* | 9/2022 | Sharma | H04B 7/15507 |
| 2022/0386093 A1* | 12/2022 | Baek | H04W 36/0085 |
| 2022/0408468 A1* | 12/2022 | Jang | H04W 72/1273 |
| 2023/0179281 A1* | 6/2023 | Svedman | H04B 7/0695 |
| | | | 455/101 |
| 2023/0180343 A1 | 6/2023 | Park et al. | |
| 2024/0080797 A1* | 3/2024 | Li | G01S 5/0218 |
| 2024/0107263 A1 | 3/2024 | Balasubramanian et al. | |
| 2025/0193639 A1 | 6/2025 | Balasubramanian | |

OTHER PUBLICATIONS

3GPP TS 38.305: "3rd Generation Partnership Project; Technical Specification Group Radio Access Network; NG Radio Access Network (NG-RAN); Stage 2 functional Specification of User Equipment (UE) Positioning in NG-RAN (Release 17)", Jul. 14, 2022, 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.1.0, Jul. 18, 2022, pp. 1-133, XP052183737, XP052211846, Sec. 4, 5.3, 7.4, 7.5, 7.6, 8.10.3.2.3.
International Search Report and Written Opinion—PCT/US2023/070873—ISA/EPO—Nov. 27, 2023.
Qualcomm Incorporated: "Potential Solutions for Sidelink Positioning", 3GPP TSG RAN WG1 #109-e, R1-2205038, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052191702, 11 pages, chapters 2-9.

* cited by examiner

SIGNALING METHODS FOR SIDELINK POSITIONING FOR HETEROGENEOUS USER EQUIPMENTS

BACKGROUND

1. Field of Disclosure

The present disclosure relates generally to the field of wireless communications, and more specifically to determining the location of a User Equipment (UE) using radio frequency (RF) signals.

2. Description of Related Art

In a data communication network, various positioning techniques can be used to determine the position of a mobile device (referred to herein as a UE). Some of these positioning techniques may involve determining distance and/or angular information of RF signals received by one or more other UEs communicatively coupled with the data communication network. In a fifth generation (5G) wireless standard, referred to as New Radio (NR), direct communication between UEs (including the transmission of RF signals for positioning) may be referred to as sidelink (SL). A positioning session between UEs may be conducted to perform positioning measurements using SL RF signals, and UEs can coordinate such SL positioning sessions to ensure efficient use of bandwidth and other wireless resources. With the potential of UEs having multiple transmission/reception points (TRPs), there may be a period of time during which heterogeneous UEs (single-TRP UEs and multiple TRP UEs) perform positioning with one another. Currently, SL protocol does not address such heterogeneous positioning.

BRIEF SUMMARY

An example method of performing sidelink (SL) positioning, according to this disclosure, may comprise receiving, at a target user equipment (UE) from an initiator UE, a discovery request corresponding to an SL positioning session, wherein the target UE comprises a plurality of transmission/reception points (TRPs). The method also may comprise determining, from the discovery request, the initiator UE is incapable of associating each TRP of the plurality of TRPs with the target UE. The method also may comprise responsive to determining the initiator UE is incapable of associating each TRP of the plurality of TRPs with the target UE, participating in the SL positioning session with the target UE by either: (i) using only one TRP of the plurality of TRPs during the SL positioning session, or (ii) using each TRP of the plurality of TRPs such that each TRP operates as a distinct UE.

An example method of performing sidelink (SL) positioning, according to this disclosure, may comprise sending, from an initiator user equipment (UE) to a target user equipment (UE), a discovery request corresponding to an SL positioning session, wherein the initiator UE comprises a plurality of transmission/reception points (TRPs). The method also may comprise sending the discovery request comprises sending a message from each TRP of the plurality of TRPs. For each TRP of the plurality of TRPs, the respective message may comprise: an identifier of the initiator UE, and an identifier of the respective TRP. The method also may comprise receiving, at the initiator UE from the target UE, a response to the discovery request. The method also may comprise, based on the response to the discovery request, determining either: the target UE is incapable of associating each of the plurality of TRPs with the initiator UE, or the target UE is capable of associating each of the plurality of TRPs with the initiator UE.

An example method of performing sidelink (SL) positioning, according to this disclosure, may comprise receiving, at a target user equipment (UE) from an initiator UE, a discovery request corresponding to an SL positioning session, wherein receiving the discovery request comprises receiving a message from each transmission/reception point (TRP) of a plurality of TRPs of the initiator UE, and for each TRP of the plurality of TRPs, the respective message comprises: an identifier of the initiator UE, and an identifier of the respective TRP. The method also may comprise associating each of the plurality of TRPs with the initiator UE based on the identifier of the initiator UE and the identifier of the respective TRP. The method also may comprise sending, from the target UE to the initiator UE, a response to the discovery request.

An example target user equipment (UE) for performing sidelink (SL) positioning, according to this disclosure, may comprise a transceiver, a memory, one or more processors communicatively coupled with the transceiver and the memory, wherein the one or more processors are configured to receive, via the transceiver from an initiator UE, a discovery request corresponding to an SL positioning session, wherein the target UE comprises a plurality of transmission/reception points (TRPs). The one or more processors further may be configured to determine, from the discovery request, the initiator UE is incapable of associating each TRP of the plurality of TRPs with the target UE. The one or more processors further may be configured to, responsive to determining the initiator UE is incapable of associating each TRP of the plurality of TRPs with the target UE, participating in the SL positioning session with the target UE by either: (i) using only one TRP of the plurality of TRPs during the SL positioning session, or (ii) using each TRP of the plurality of TRPs such that each TRP operates as a distinct UE.

An example initiator user equipment (UE) for performing sidelink (SL) positioning, according to this disclosure, may comprise a transceiver, a memory, one or more processors communicatively coupled with the transceiver and the memory, wherein the one or more processors are configured to send, via the transceiver to a target UE, a discovery request corresponding to an SL positioning session, wherein: the initiator UE comprises a plurality of transmission/reception points (TRPs), sending the discovery request comprises sending a message from each TRP of the plurality of TRPs, and for each TRP of the plurality of TRPs, the respective message comprises: an identifier of the initiator UE, and an identifier of the respective TRP. The one or more processors further may be configured to receive, via the transceiver from the target UE, a response to the discovery request. The one or more processors further may be configured to, based on the response to the discovery request, determine either: the target UE is incapable of associating each of the plurality of TRPs with the initiator UE, or the target UE is capable of associating each of the plurality of TRPs with the initiator UE.

An example target user equipment (UE) for performing sidelink (SL) positioning, according to this disclosure, may comprise a transceiver, a memory, one or more processors communicatively coupled with the transceiver and the memory, wherein the one or more processors are configured to receive, via the transceiver from an initiator UE, a discovery request corresponding to an SL positioning session, wherein: receiving the discovery request comprises receiving a message from each transmission/reception point (TRP) of a plurality of TRPs of the initiator UE. The one or more processors further may be configured to for each TRP of the plurality of TRPs, the respective message comprises: an identifier of the initiator UE, and an identifier of the respective TRP. The one or more processors further may be configured to associate each of the plurality of TRPs with the initiator UE based on the identifier of the initiator UE and the identifier of the respective TRP. The one or more processors further may be configured to send, via the transceiver to the initiator UE, a response to the discovery request.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
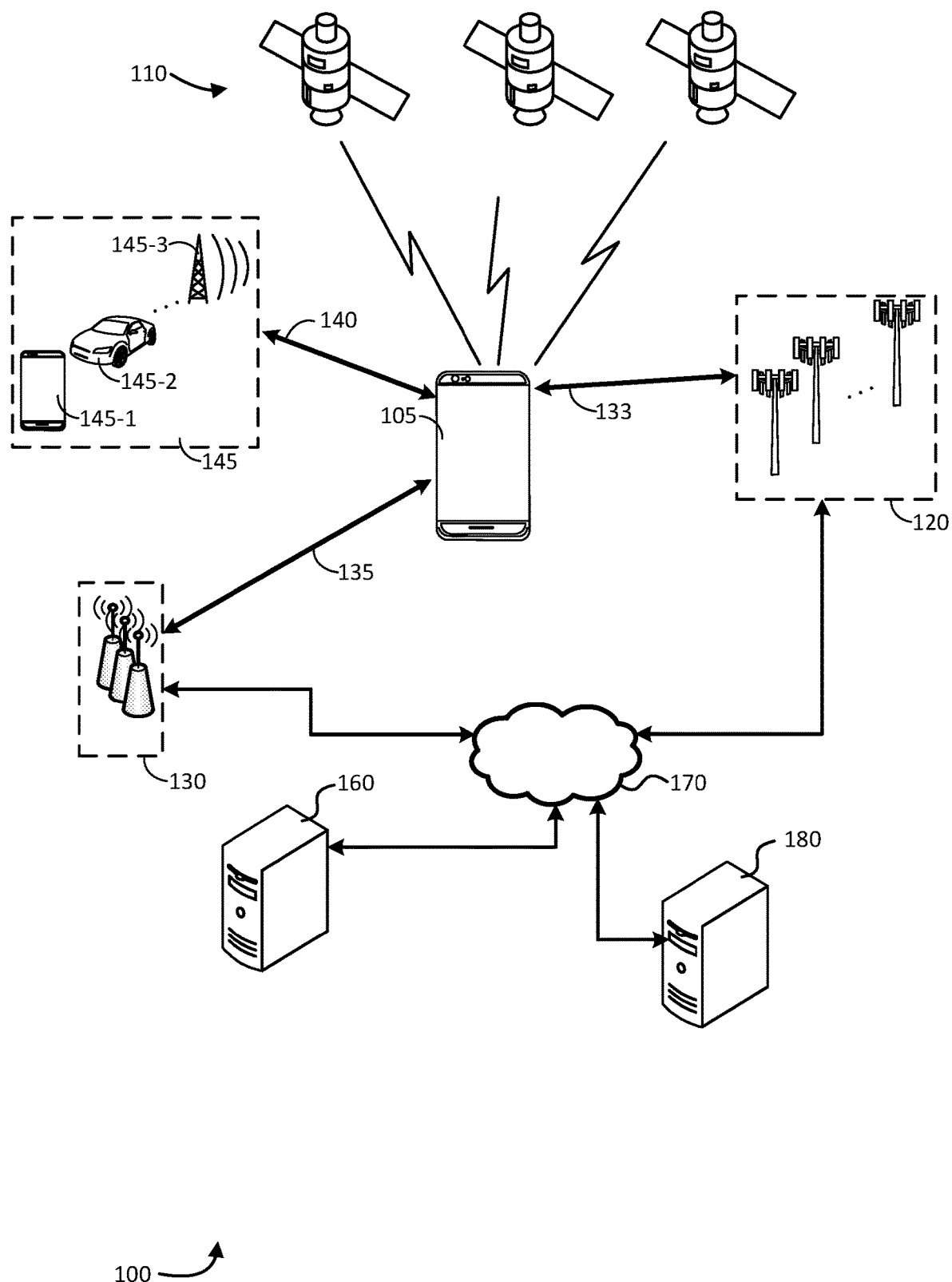
FIG. 1 is a simplified illustration of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

Position determination of a UE may be based at least in part on measurements of signals transmitted and/or received by one or more transmission/reception points (TRPs) of the UE via sidelink (SL). As noted, with the potential of UEs having multiple TRPs (mTRP), there may be a period of time in which heterogeneous UEs (UEs comprising a single TRP and UEs comprising multiple TRPs) perform positioning. Single-TRP UEs may be operating on a release of the relevant 3GPP sidelink protocols (e.g., Rel 18) that does not have capabilities to address performing positioning sessions with mTRP UEs. However, there is likely to be a period of time heterogeneous positioning between these single TRP-capable UEs and mTRP-capable UEs occurs. Embodiments herein provide techniques for addressing positioning between heterogeneous UEs. Details regarding the embodiments are provided herein, after a description of relevant technology.

FIG. 1 is a simplified illustration of a positioning system 100 in which a mobile device 105, location server 160, and/or other components of the positioning system 100 can use the techniques provided herein for positioning of the mobile device 105, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed hereafter.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. In a wireless cellular network (e.g., LTE or 5G), the mobile device 105 may be referred to as a user equipment (UE)

The base stations 120 and access points (APs) 130 may be communicatively coupled to the network 170. In some embodiments, the base stations 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computer system configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 are used in the position determination of a particular mobile device 105, the mobile device 105 for which the position is to be determined may be referred to as the "target mobile device," and each of the other mobile devices 145 used may be referred to as an "anchor mobile device." (In a cellular/mobile broadband network, the terms "anchor UE" and "target UE" may be used.) For position determination of a target mobile device, the respective positions of the one or more anchor mobile devices may be known and/or jointly determined with the target mobile device. Direct communication between the one or more other mobile devices 145 and mobile device 105 may comprise SL and/or similar Device-to-Device (D2D) communication technologies. SL is a form of D2D communication defined by 3GPP under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
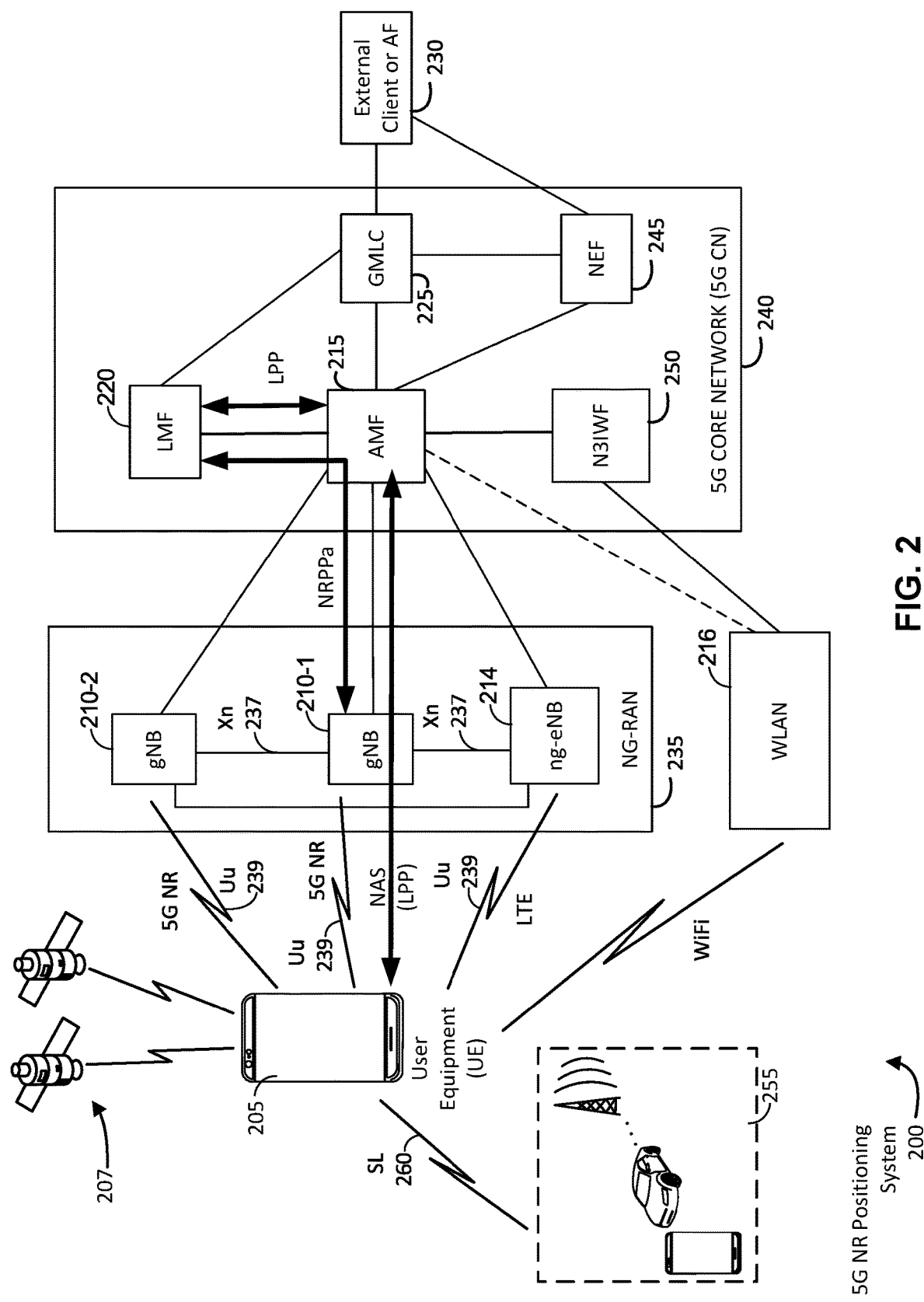
FIG. 2 is a diagram of a 5G NR positioning system 200, according to an embodiment.

FIG. 2 is a diagram of a 5G NR positioning system 200, illustrating an embodiment of a positioning system (which may correspond to at least a portion of a larger positioning system as described herein, such as the positioning system 100 of FIG. 1) implementing 5G NR. The 5G NR positioning system 200 may be configured to determine the location of a user equipment (UE) 205 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations described elsewhere herein, and the WLAN 216 may correspond with one or more access points described elsewhere herein. Optionally, the 5G NR positioning system 200 additionally may be configured to determine the location of a UE 205 by using an LMF 220 (which may correspond with a location server as described elsewhere herein) to implement the one or more positioning methods. Here, the 5G NR positioning system 200 comprises a UE 205, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 207. As previously indicated, satellites 207 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 207 may comprise NTN satellites that may be communicatively coupled with the LMF 220 and may operatively function as a TRP (or TP) in the NG-RAN 235. As such, satellites 207 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 207, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like one or more RATs as described elsewhere herein) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to an external client as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations as described elsewhere herein and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 205 via wireless communication between the UE 205 and one or more of the gNBs 210, which may provide wireless communications access to the 5G CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., access points, as described elsewhere herein). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 205 and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220, described in more detail hereafter.

Positioning of the UE 205 in a 5G NR positioning system 200 further may utilize measurements between the UE 205 and one or more other UEs 255 via a SL connection SL 260. As shown in FIG. 2, the one or more other UEs 255 may comprise any of a variety of different device types, including mobile phone, vehicle, roadside units (RSU), other device types, or any combination thereof. One or more position measurement signals are sent via SL 260 to the UE 205 from the one or more other UEs 255, to the one or more other UEs 255 from the UE 205, or both. Various signals may be used for position measurement, including SL PRS (also referred to as "SL-PRS"). In some instances, the position of at least one of the one or more of the other UEs 255 may be determined at the same time (e.g., in the same positioning session) as the position of the UE 205. In some embodiments, the LMF 220 may coordinate the transmission of positioning signals via SL 260 between the UE 205 and the one or more other UEs 255. Additionally or alternatively, the UE 205 and the one or more other UEs 255 may coordinate a positioning session between themselves, without an LMF 220 or even a Uu connection 239 to an access node of the NG-RAN 235. To do so, the UE 205 and the one or more other UEs 255 may communicate messages via the SL 260 using SL positioning protocol (SLPP). In some scenarios, the one or more other UEs 255 may have a Uu connection 239 with an access node of the NG-RAN 235 and/or Wi-Fi connection with WLAN 216 when the UE 205 does not. In such instances, the one or more other UEs 255 may operate as relay devices, relaying communications to the network (e.g., LMF 220) from the UE 205. In such instances, a plurality of other UEs 255 may form a chain between the UE 205 and the access node.

In a 5G NR positioning system 200, positioning methods can be categorized as being "UE assisted" or "UE based." This may depend on where the request for determining the position of the UE 205 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 205 may obtain location measurements and send the measurements to a location server (e.g., LMF 220) for computation of a location estimate for UE 205. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of SL signals transmitted by other UEs, which may serve as anchor points for positioning of the UE 205 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 207), WLAN, etc.

With a UE-based position method, UE 205 may obtain location measurements (e.g., which may be the same as or similar to location measurements for a UE assisted position method) and may further compute a location of UE 205 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 205, and/or may receive measurements obtained by UE 205 or by an AP in WLAN 216 in the case of N3IWF 250, and may send the measurements to a location server (e.g., LMF 220) for computation of a location estimate for UE 205.

Positioning of the UE 205 also may be categorized as UL, DL, or DL-UL based, depending on the types of signals used for positioning. If, for example, positioning is based solely on signals received at the UE 205 (e.g., from a base station or other UE), the positioning may be categorized as DL based. On the other hand, if positioning is based solely on signals transmitted by the UE 205 (which may be received by a base station or other UE, for example), the positioning may be categorized as UL based. Positioning that is DL-UL based includes positioning, such as RTT-based positioning, that is based on signals that are both transmitted and received by the UE 205. SL-assisted positioning comprises signals communicated between the UE 205 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3A:
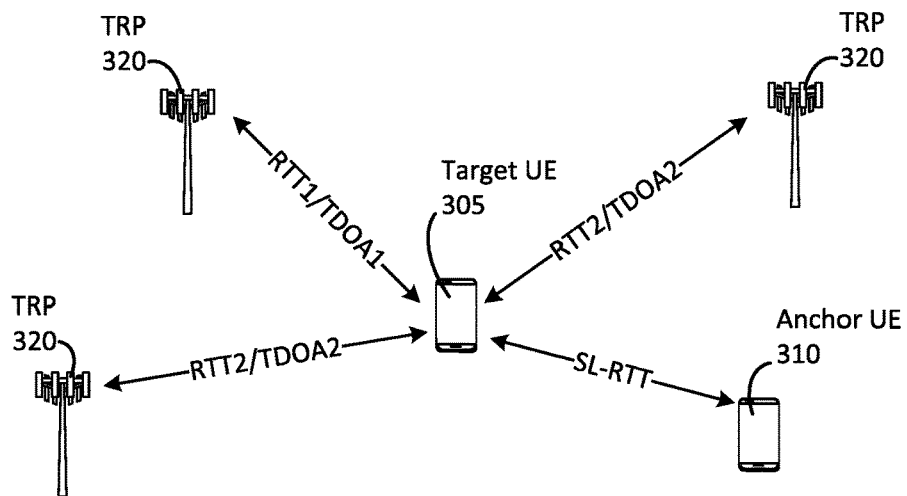
FIGS. 3A-3C are simplified diagrams of scenarios in which sidelink (SL) positioning may be used to determine the position of a target user equipment (UE), according to some embodiments.
Figure 3B:
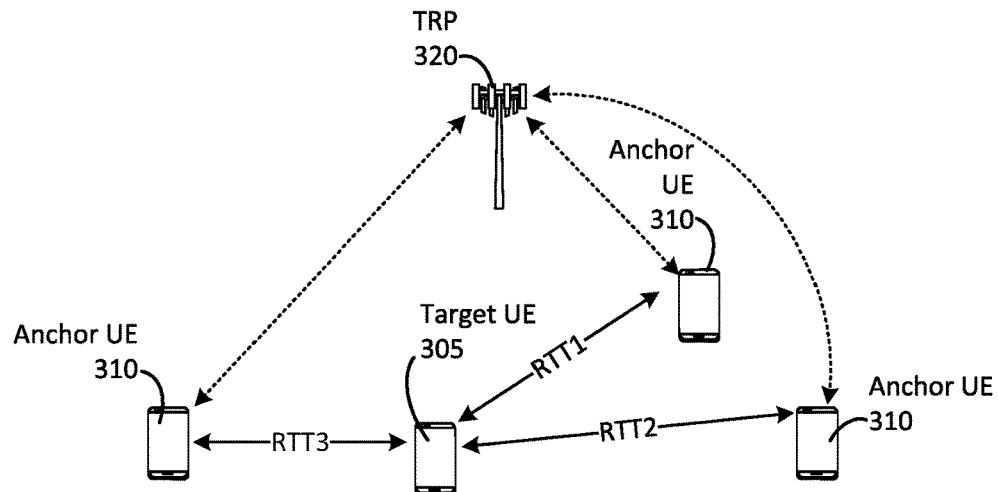
Figure 3C:
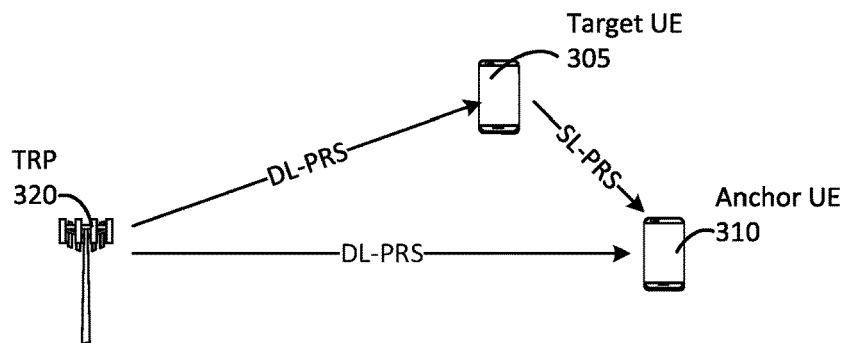

FIGS. 3A-3C are simplified diagrams of scenarios in which SL positioning may be used to determine the position of a target UE 305, according to some embodiments. One or more anchor UEs 310 may be used to send and/or receive reference signals via SL. As illustrated, positioning may be further determined using one or more base stations 320 (a Uu interface). It will be understood, however, that the signals used for positioning of the UE 305 may vary, depending on desired functionality. More particularly, some types of positioning may utilize signals other than RTT/TDOA as illustrated in FIGS. 3A-3C.

The diagram of FIG. 3A illustrates a configuration in which the positioning of a target UE 305 may comprise RTT and/or TDOA measurements between the target UE 305 and three base stations 320. In this configuration, the target UE 305 may be in coverage range for DL and/or UL signals via Uu connections with the base stations 320. Additionally, the anchor UE 310 at a known location may be used to improve the position determination for the target UE 305 by providing an additional anchor. As illustrated, ranging may be performed between the target UE 305 and anchor UE 310 by taking RTT measurements via the SL connection between the target UE 305 and anchor UE 310.

The diagram of FIG. 3B illustrates a configuration in which the positioning of a target UE 305 may be SL-only positioning/ranging. In this configuration, the target UE 305 may perform RTT measurements via SL connections between a plurality of anchor UEs 310. In this example, the target UE 305 may not be in UL coverage of the base station 320, and therefore each anchor UE 310 may report RTT measurement information to the network of via a Uu connection between each anchor UE 310 and the base station 320. (In cases in which a UE relays information between a remote UE and a base station, a UE may be referred to as a "relay" UE.) Such scenarios may exist when the target UE 305 has weaker transmission power than anchor UEs 310 (e.g., the target UE 305 comprises a wearable device, and anchor UEs comprise larger cellular phones, IoT devices, etc.). In other scenarios in which the target UE 305 is within UL coverage of the base station 320, the target UE 305 may report RTT measurements directly to the base station 320. In some embodiments, no base station 320 may be used, in which case one of the UEs (e.g., the target UE 305 or one of the anchor UEs 310) may receive RTT measurement information and determine the position of the target UE 305.

The diagram of FIG. 3C illustrates a configuration in which the positioning of a target UE 305 may comprise the target UE 305 and anchor UE 310 receiving a reference signal (DL-PRS) from the base station 320, and the target UE 305 sending a reference signal (SL-PRS) to the anchor UE 310. The positioning of the target UE can be determined based on known positions of the base station 320 and anchor UE 310 and a time difference between a time at which the anchor UE 310 receiving the reference signal from the base station 320 and a time at which the anchor UE 310 receives the reference signal from the target UE 305.

As previously discussed, the use of SL positioning (e.g., SL-only or Uu/SL positioning, as illustrated in FIGS. 3A-3C) may utilize a Resource Pool for Positioning (RP-P). RP-P may be conveyed to UEs via a SL configuration (e.g., using techniques described hereafter), and may designate particular resource pools for SL reference signals in different scenarios. Resource pools comprise a set of resources (e.g., frequency and time resources in in an orthogonal frequency-division multiplexing (OFDM) scheme used by 4G and 5G cellular technologies) that may be used for the transmission of RF signals via SL for positioning. Each resource pool may further include a particular subcarrier spacing (SCS), cyclic prefix (CP) type, bandwidth (BW) (e.g., subcarriers, bandwidth part, etc.), time-domain location (e.g., periodicity and slot offset) Resource pools may comprise, for example, Tx resource pools for "Mode 1" SL positioning in which SL positioning is performed using one or more network-connected UEs, in which case network-based resource allocation may be received by a network-connected UE via a Uu interface with a base station (e.g., via Downlink Control Information (DCI) or Radio Resource Control (RRC)). Tx resource pools for "Mode 2" SL positioning in which autonomous resource selection is performed by UEs without network-based resource allocation. Resource pools may further comprise Rx resource pools, which may be used in either Mode 1 or Mode 2 SL positioning. Each RP-P configuration may be relayed via a physical sidelink control channel (PSCCH), which may reserve one or more SL-PRS configurations. Each of the one or more SL-PRS configurations of in RP-P may include respective specific physical layer features such as a number of symbols, comb type, comb-offset, number of subchannels, some channel size, and start resource block (RB). The RP-P configuration may further include a sensing configuration, power control, and/or Channel Busy Ratio (CBR).

Figure 4A:
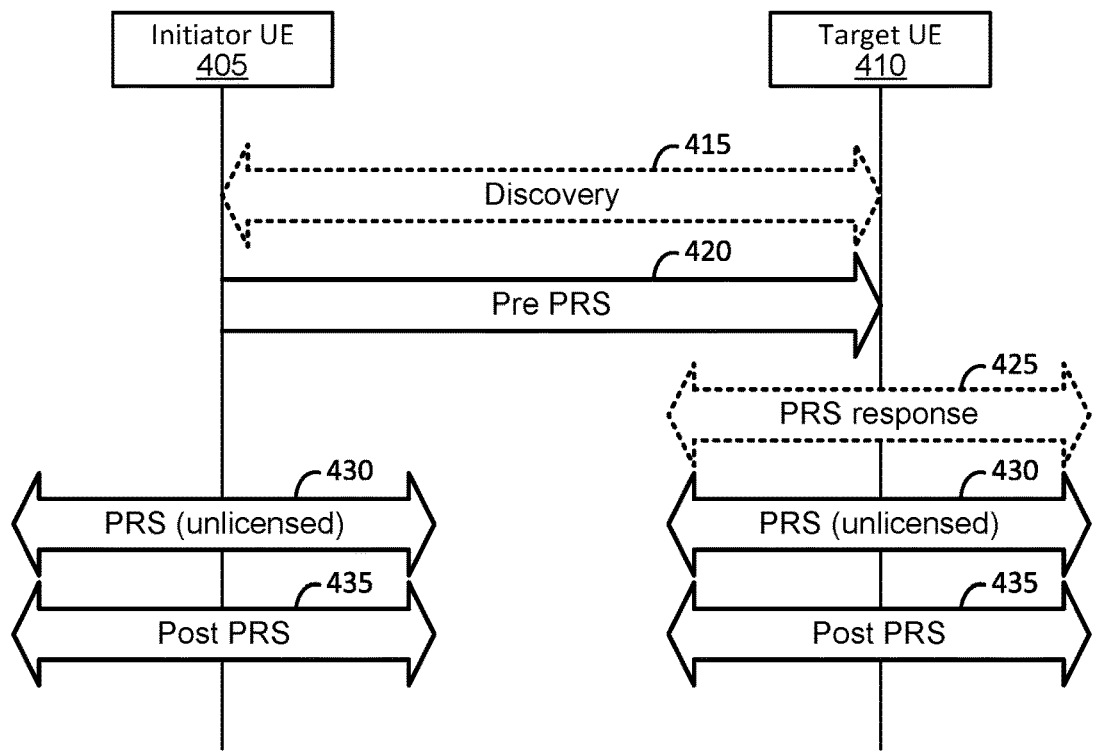
FIGS. 4A and 4B are diagrams illustrating how positioning sessions via SL may be performed, according to some embodiments.
Figure 4B:
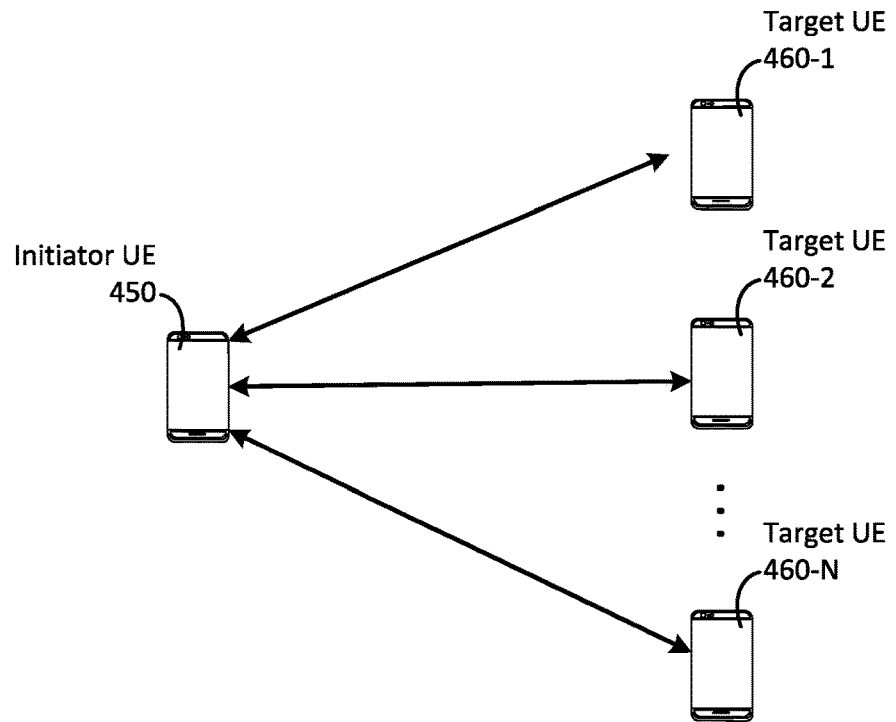

FIGS. 4A and 4B are diagrams illustrating how positioning sessions via SL may be performed, according to some embodiments. As with other figures provided herein, FIGS. 4A and 4B are provided as non-limiting examples. Alternative embodiments may include additional or alternative functions or components.

FIG. 4A illustrates a SL positioning session (also referred to herein as a "ranging session" or simply "ranging") between two UEs: an initiator UE 405 and a target UE 410. Optional operations are illustrated in with dotted lines. As illustrated, the SL session may begin with a discovery process 415 in which initiator UE 405 and target UE 410 may determine which UEs are nearby, discovering each other if each other's presence is not already known.

Note that, with regard to positioning sessions regarding "initiator" and "target" UEs (e.g., as illustrated in FIGS. 4A and 4B), the term "target UE" may have a slightly different meaning that has previously used. Whereas previous use referred to a "target UE" as a UE for which a location is desired, a "target UE" in a positioning session with an initiator UE may refer to a UE responding to the initiator UE in a positioning session. In this latter case, the location of the target UE may or may not be desired. (E.g., in some instances, a target UE may have a known position and may be used as an anchor to find the position of the initiator UE.)

At operation 420, the initiator UE 405 provides the target UE 410 with pre-PRS information, which can convey session parameters (e.g., timing, frequency, etc. of PRS transmission), to which the target UE 410 may optionally respond at operation 425. This response may comprise an acknowledgment, a negotiation of different session parameters, or the like. The initiator UE 405 and target UE 410 may then transmit PRS, as indicated at operations 430. As noted, in some embodiments, this may occur in an unlicensed spectrum (e.g., intelligent transportation systems (ITS) spectrum), which may provide for a larger bandwidth, resulting in higher accuracy. The transmission of the PRS at operations 430 may be in accordance with the session parameters provided in the pre-PRS at operation 420. Finally, initiator UE 405 and target UE 410 may transmit post PRS information at operations 435. Post PRS information may include, for example, measurement information (e.g., a ToA measurement for RTT determination), a determined range (e.g., between the initiator UE 405 and target UE 410), a determined position (e.g., of the initiator UE 405 and/or target UE 410), or any combination thereof.

FIG. 4B is a diagram of a simplified scenario in which a single initiator UE 450 may perform positioning sessions with a plurality of target UEs 460-1, 460-2, and 460-N (collectively and generically referred to herein as target UEs 460). As shown, the initiator UE 450 may communicate with any number of target UEs 460 (e.g., N target UEs). For each target UE 460, the initiator UE 450 may perform a positioning session as shown in FIG. 4A, for example. As illustrated in FIG. 4A, the transmission of PRS (operation 430) and the transmission of post PRS (operation 435) may not be limited between the initiator UE 405 and target UE 410 pair, but may be broadcast or multicast to multiple receiving UEs. Thus, all UEs in the scenario shown in FIG. 4B may receive positioning information from all other participating UEs. Known locations of the UEs may be shared as well, which can result in an absolute position determination. If UE locations are not known, inter-UE ranges may still be shared. To coordinate among multiple target UEs 460, the initiator UE 450 may expand on the two-UE session shown in FIG. 4A to indicate (e.g., in pre-PRS at operation 420) to each of the target UEs 460 participating in the SL positioning session when the PRS transmission times are of each participating UE (e.g., an order in which participating UEs are to transmit PRS).

In current versions of the 3GPP standards regarding SL positioning, it is assumed that each UE has a single TRP. However, this may not always be the case. Vehicle UEs (VUEs) are a type of UE that may incorporate multiple TRPs (mTRP). An mTRP VUE may include one TRP at the front of the vehicle and another TRP at the back of the vehicle, for example. Other types of UEs may also include multiple TRPs, with some potentially having more than two TRPs. However, adoption of mTRP-capable release UEs may be gradual. It is likely that there will be a stage during the rollout of a new mTRP-capable release of SL standards in which a heterogeneous mixture of UEs exist: UEs capable of performing positioning sessions with single-TRP UEs may have to coexist with mTRP-capable UEs. Having a design for SL protocol that can operate across different releases stems from (i) a case in which a first UE could have only one TRP installed while a second UE could have more than one TRPs installed (i.e., different capability UEs) and (ii) a case in which all UEs may the same number of TRPs, however different UEs may enable different number of TRPs during their SL measurements. Examples of these cases are further discussed with regard to FIGS. 5A and 5B.

Figure 5A:
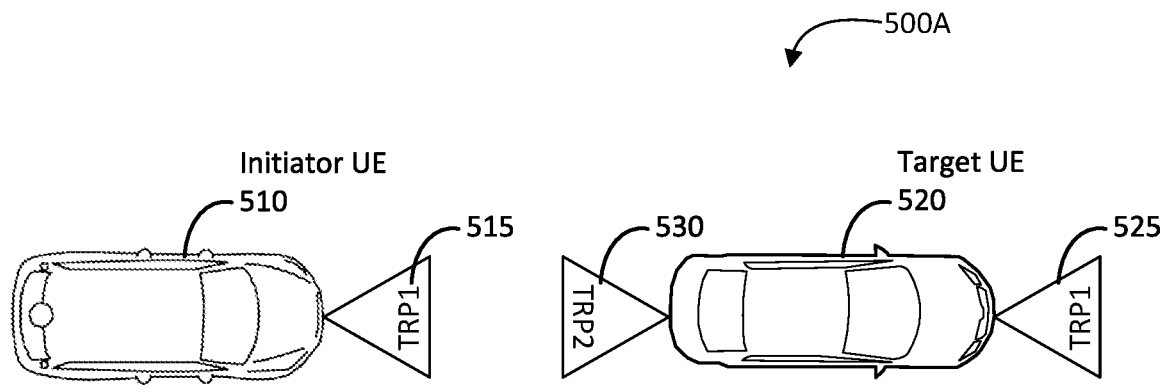
FIGS. 5A and 5B are diagrams of examples of possible heterogeneous UE positioning, according to an embodiment.
Figure 5B:
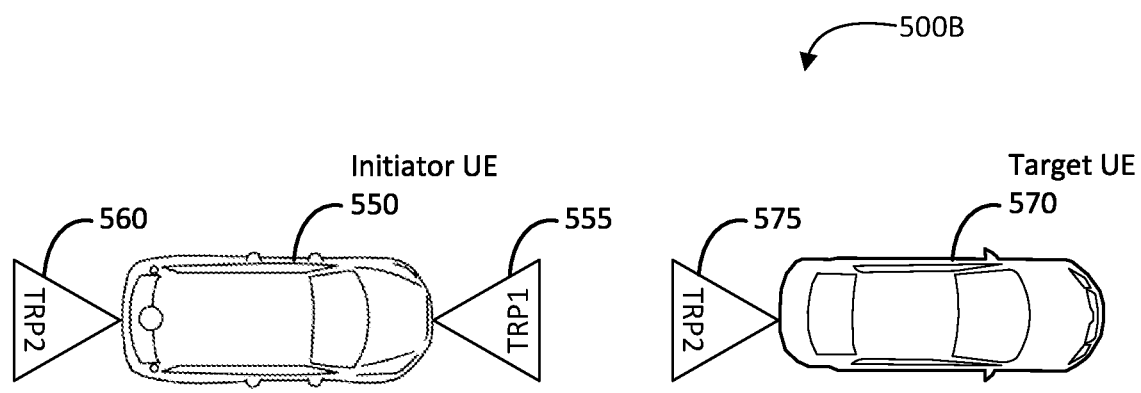

FIGS. 5A and 5B are diagrams illustrating UEs (in particular, VUEs) from an overhead perspective, providing examples of possible heterogeneous UE positioning between a single-TRP UE and a mTRP UE. FIG. 5A shows a first scenario 500A in which an initiator UE 510 has a single TRP 515 and a target UE 520 has two TRPs: a first TRP 525 (at the front of the vehicle) and a second TRP 530 (at the back of the vehicle).

In the first scenario 500A, the initiator UE 510 initiates an SL positioning session with the target UE 520. If the initiator UE 510 is only a single-TRP capable (e.g., incapable of performing positioning sessions with mTRP UEs), one possible way in which the target UE 520 could operate in this scenario 500A to ensure compatibility may be to enable only a single TRP (e.g., its second TRP 530) so that conventional sidelink protocol can be used. However, this scheme fails to leverage the mTRP capability of the target UE to perform enhanced sidelink ranging. That is, an SL positioning session in which only one TRP is used would fail to exploit the multiple spatial ranging measurements that could be performed between TRP 515 and each of TRPs 525 and 530. On the other hand, if the target UE 520 sends multiple postPRS/prePRS measurements belonging to each of TRPs 525 and 530 during an SL positioning session with the initiator UE 510, initiator UE 510 may not be capable of understanding it if it is only capable of performing positioning sessions with single-TRP UEs.

FIG. 5B illustrates a second scenario 500B in which an initiator UE 550 has multiple TRPs (a first TRP 555 and a second TRP 560) and target UE 570 has a single TRP 575. Again, if a target UE 570 is incapable of performing SL positioning sessions with mTRP UEs, then the capabilities in this scenario 500B are limited. For example, the initiator UE 550 may enable only a single TRP to be compatible with the target UE 570, which again may fail to take advantage of both TRPs 555 and 560 of the initiator UE 550, which could result in less accuracy from the SL positioning session. If the initiator UE 550 uses mTRP, it may result in transmitting PRS from both TRP 555 and TRP 560, which the target UE 570 may not understand.

According to embodiments herein, these issues may be addressed in a variety of ways as shown, for example, in FIGS. 6-9.

Figure 6:
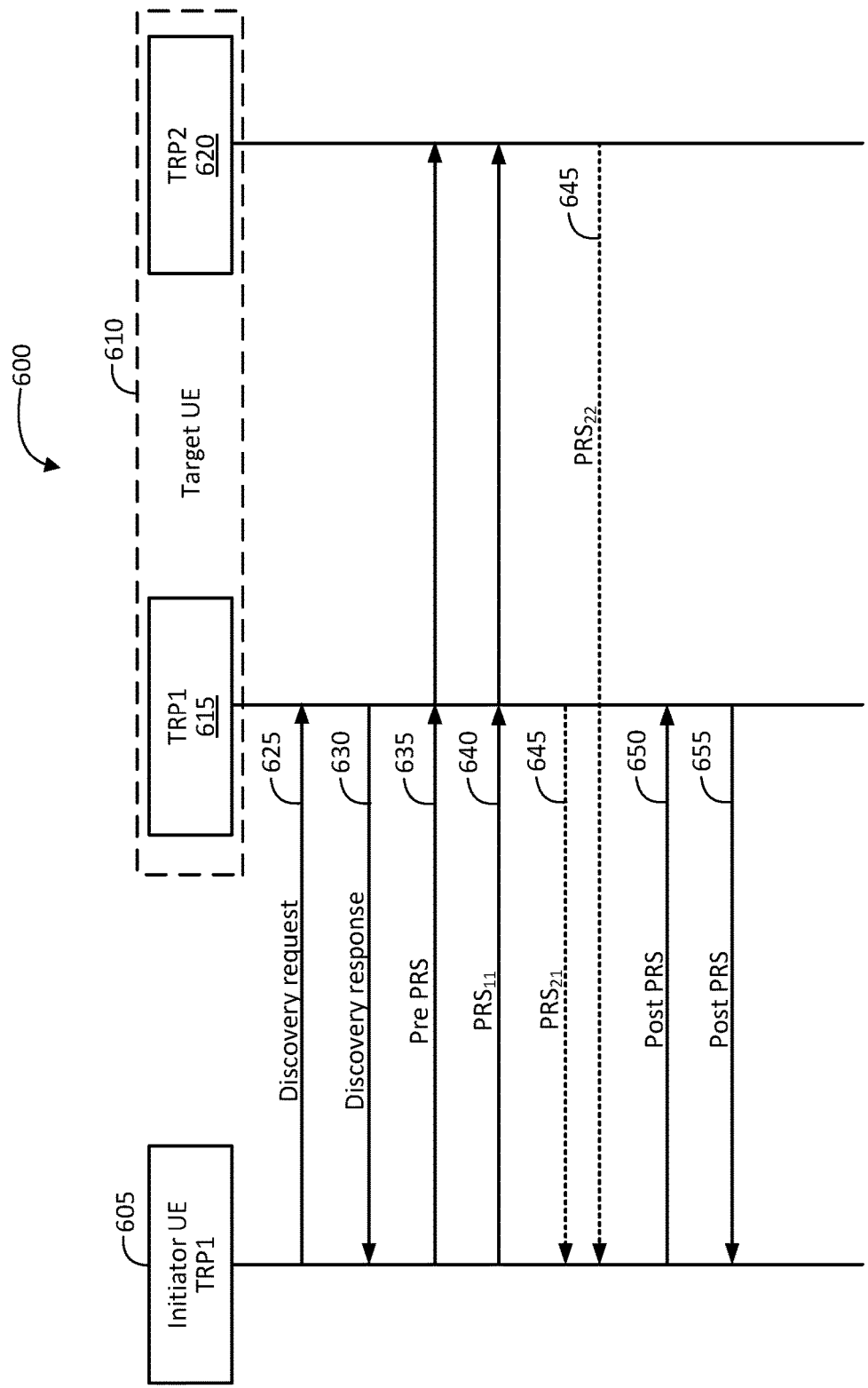
FIG. 6 is a signal flow diagram illustrating an embodiment of a method of performing SL positioning between an initiator UE having a single transmission/reception point (TRP) and a target UE having a first TRP and a second TRP.

FIG. 6 comprises a signal flow diagram, illustrating an embodiment of a method 600 of performing SL positioning between an initiator UE 605 having a single TRP and a target UE 610 having a first TRP 615 and a second TRP 620. This set up may reflect the scenario 500A of FIG. 5A, for example. In this example, a target UE 610 may mimic the functionality of a UE having a single TRP.

The method 600 may begin with a discovery request sent by the initiator UE 605, as shown at operation 625, which is responded to by the target UE 610 with a discovery response, shown at operation 630. Here, the target UE 610 may be made aware of the limited capability of the initiator UE 605 from the discovery request message received at operation 625. As discussed in more detail below, this information may be conveyed via an explicit flag (e.g., indicating whether the initiator UE 605 is or is not mTRP capable) and/or via another indication (e.g., a release number corresponding to a release that is or is not mTRP capable). With that knowledge, the target UE 610 can transmit the discovery responses at operation 630, behaving if it has a single TRP. Further, target UE 610 also may be aware of the limited capabilities of the initiator UE 605 based on the PRS sequence transmitted by initiator UE 605, which may be conveyed in pre-PRS transmitted at operation 635.

The remainder of the method 600 may be executed as if target UE 610 has a single TRP. That is, in accordance with a PRS configuration for the positioning session (e.g., in the pre-PRS transmitted at operation 635), the initiator UE 605 may transmit PRS at operation 640, which may be measured by the target UE 610. According to some embodiments, both TRPs 615 and 620 may measure the PRS from the initiator UE 605. The target UE may further transmit PRS from either first TRP 615 or second TRP 620, as indicated at operation 645. A decision by the target UE 610 regarding which TRP 615 or 620 to use to measure the PRS at operation 640 and transmit the PRS at operation 645 may be based on different factors, as described in more detail hereafter. The initiator UE 605 and the target UE 610 may then exchange post PRS information, as indicated at operations 650 and 655. This method 600, therefore, can make initiator UE 605 agnostic to a target UE 610 having more than one TRPs.

Depending on desired functionality, the target UE 610 may transmit PRS at operation 645 using any of a variety of options. To discuss these options, the PRS transmitted by the TRP of the initiator UE 605 may be referred to as $PRS_{11}$, and PRS transmitted by TRP 615 and TRP 620 may be referred to as $PRS_{21}$ and $PRS_{22}$, respectively. As shown in FIG. 6, each TRP of the target UE 610 may receive the $PRS_{11}$ from the initiator UE 605. Further, for ranging operations performed in the SL positioning session, transmission and received times can be measured and communicated. In this example, the time at which initiator UE 605 transmits $PRS_{11}$ may be referred to as $T_{PRS1,TX}$, and the times at which TRPs 615 and 620 receive $PRS_{11}$ may be referred to as $T_{PRS11,RX}$ and $T_{PRS12,RX}$, respectively.

With these terms in mind, a first option for transmitting PRS by the target UE 610 at operation 645 may comprise transmitting the PRS with the TRP that had the earliest time of arrival of $PRS_{11}$ from the initiator UE 605, measured at operation 640. That is, TRP k that target UE 610 uses for transmitting PRS to initiator UE 605 at operation 645 may be determined by the following:

$$k = \arg\min_{m}\{T_{PRS1m,RX}\}. \quad (1)$$

Another option for transmitting PRS by the target UE 610 may comprise transmitting from the TRP that has higher probability of having line of sight (LoS) path with the initiator UE 605. This can help ensure accuracy of ranging measurements. In this option, the target UE 610 may utilize one or more additional sensors, such as a camera, radar, etc. to determine the probability of an LoS condition at either or both of the first TRP 615 or the second TRP 620. It may do this, for example, by identifying obstruction, identifying the initiator UE 605, or some combination thereof. If both TRPs 615 and 620 are equally probable of having an LoS condition (e.g., both TRPs 615 and 620 are equally obstructed/unobstructed), other factors may be used to determine which TRP to use (e.g., based on a ToA and/or power measurements of the PRS transmitted by the initiator UE 605 at operation 640).

Another option for transmitting PRS by the target UE 610 may comprise transmitting the PRS at operation 645 from a randomly chosen TRP or the one that consumes less power/less antenna elements. Depending on desired functionality, additional and/or alternative factors may be used in the selection of which TRP to use for transmitting PRS.

The information provided by the target UE 610 in the post PRS transmitted at operation 655 also may vary depending on desired functionality, including which TRP (TRP 615 or TRP 620) to transmit the PRS at operation 645. Assuming, for example, that the target UE 610 transmits from the first TRP 615, the PRS transmit time by the first TRP 615 may be referred to as $T_{TRP21,TX}$. In that case, to obtain processing time that is may be included in a post PRS message transmitted at operation 655, the arrival time $T_{arr}$ at target UE 610 is calculated using one of three options, for example. In a first option, $T_{arr}$ is calculated to the minimum of the arrival times over all TRP. That is:

$$T_{arr} = \min\{T_{PRS11,RX}, T_{PRS12,RX}\}, \quad (2)$$

where $T_{PRS11,RX}$ is the time of arrival of the $PRS_{11}$ at first TRP 615, and $T_{PRS12,RX}$ is the time of arrival of the $PRS_{11}$ at second TRP 620.

According to a second option, $T_{arr}$ is calculated as the mean of the arrival times for both TRPs 615 and 620.

According to a third option, $T_{arr}$ is calculated based on which TRP is used to transmit PRS to initiator UE 605 at operation 645 (first TRP 615 or second TRP 620). For example, if first TRP 615 is used, then the arrival time at the first TRP 615, $T_{PRS11,RX}$, can be used. Hence $T_{arr}=T_{PRS11,RX}$. Otherwise, if the second TRP 620 is used, then $T_{arr}=T_{PRS12,RX}$.

Using the arrival time, $T_{arr}$ (determined, for example, using one of the above options), the target UE 610 may then calculate a processing time to be included in the post PRS message (sent at operation 655) as $T_{arr}-T_{TRP21,TX}$. This processing time can be used by the initiator UE 605 to determine an RTT measurement for ranging between the initiator UE 605 and target UE 610.

Figure 7:
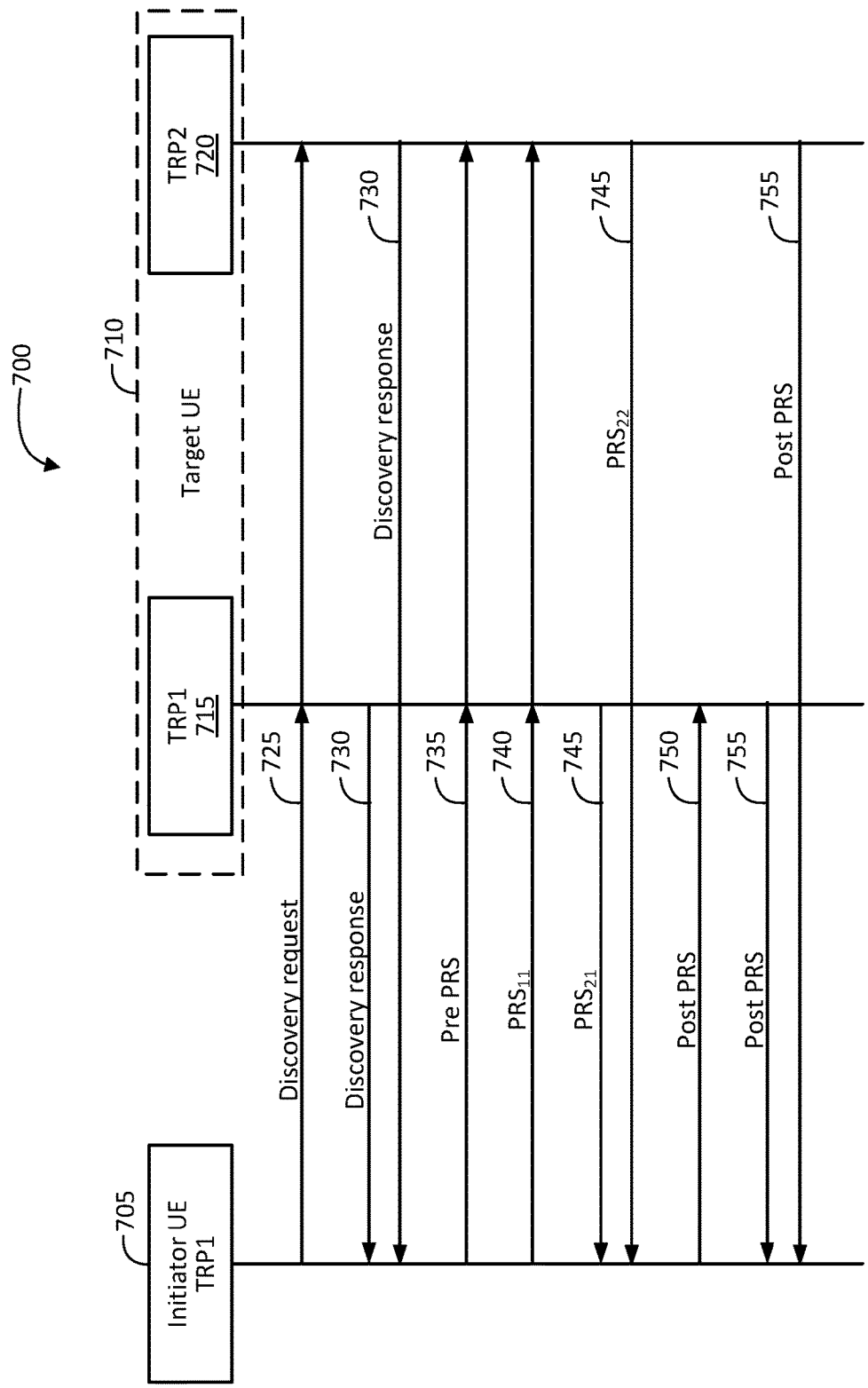
FIG. 7 is a signal flow diagram illustrating another embodiment of a method of performing SL positioning between an initiator UE having a single TRP and a target UE having a first TRP and a second TRP.

FIG. 7 comprises a signal flow diagram, illustrating another embodiment of a method 700 of performing SL positioning between an initiator UE 705 having a single TRP and a target UE 710 having a first TRP 715 and a second TRP 720. Similar to FIG. 6, set up may reflect the scenario 500A of FIG. 5A, for example. In this example, the target UE 710 may mimic the functionality of a plurality of UEs (e.g., a UE corresponding to each TRP).

The method may begin with a discovery request sent by the initiator UE 705, as shown at operation 725, which is responded to by the discovery responses, shown at operations 730, sent by each TRP 715 and 720 of the target UE 710. As previously explained with respect to FIG. 6, the target UE 710 may determine whether or not the initiator UE 705 is mTRP capable based on the formatting and/or content of the discovery request. With that knowledge, the target UE 710 can transmit the discovery responses at operation 730, emulating two different target UEs. Further, target UE 710 also may be aware of the limited capabilities of the initiator UE 705 based on the PRS sequence transmitted by initiator UE 705, which may be conveyed in pre-PRS transmitted at operation 735.

By sending two discovery responses at operation 730, the target UE 710 can effectively operate the second TRP 720 as a "virtual" UE. That is, upon receiving the discovery responses, the initiator UE 705 may treat each responding TRPs 715 and 720 as separate UEs. More generally, a target UE having m TRPs may send m discovery response messages in response to a discovery request from an initiator UE. This option becomes useful to leverage the multiple TRPs of the target UE 710 for enhanced positioning, while able to coexist with single-TRP UEs such as the initiator UE 705 in FIG. 7.

The remainder of the method 700 may be executed as if TRP 715 and TRP 720 were two separate UEs. That is, in accordance with a PRS configuration for the positioning session (e.g., in the pre-PRS transmitted at operation 735), the initiator UE 705 may transmit PRS at operation 740, which may be measured by each of TRPs 715 and 720. And TRPs 715 and 720 may each transmit their PRS at operations 745. The initiator UE 705 and each of the TRPs 715 and 720 of the target UE 710 may then exchange post PRS information, as indicated at operations 750 and 755. This method 700, therefore, can make initiator UE 705 agnostic to a target UE 710 having more than one TRPs.

The post PRS provided by the target UE 710 may be straightforward. In contrast to the method 600 of FIG. 6, in which the target UE 610 could provide PRS and post PRS in different ways, the method 700 may simply involve transmitting a post PRS message for each TRP (first TRP 715 and second TRP 720) in which the post PRS message for each TRP contains the processing time corresponding to difference of arrival time of $PRS_{11}$ sent by the initiator UE 705 at the respective TRP, and the respective transmit time for that TRP.

By performing behaving as a single-TRP UE (e.g., as in method 600) or as multiple single-TRP UEs (e.g., as in method 700), a target UE can help ensure backward compatibility with single-TRP capable initiator UEs that may not be capable of positioning sessions with mTRP UEs. According to some embodiments, a target UE may determine whether to implement method 600 or method 700 based on any of a variety of factors. Because method 700 utilizes multiple TRPs it may result in higher accuracy ranging. As such, the target UE may decide to implement method 700 (rather than method 600) based on a requested accuracy (e.g., quality of service (QoS) by the initiator UE. Additional or alternative factors for deciding whether to implement method 600 (behaving as a single UE) or method 700 (behaving as multiple UEs) may include available timing/scheduling resources, available processing resources, whether one or more TRPs of the target UE are obstructed, or any combination thereof.

Figure 8:
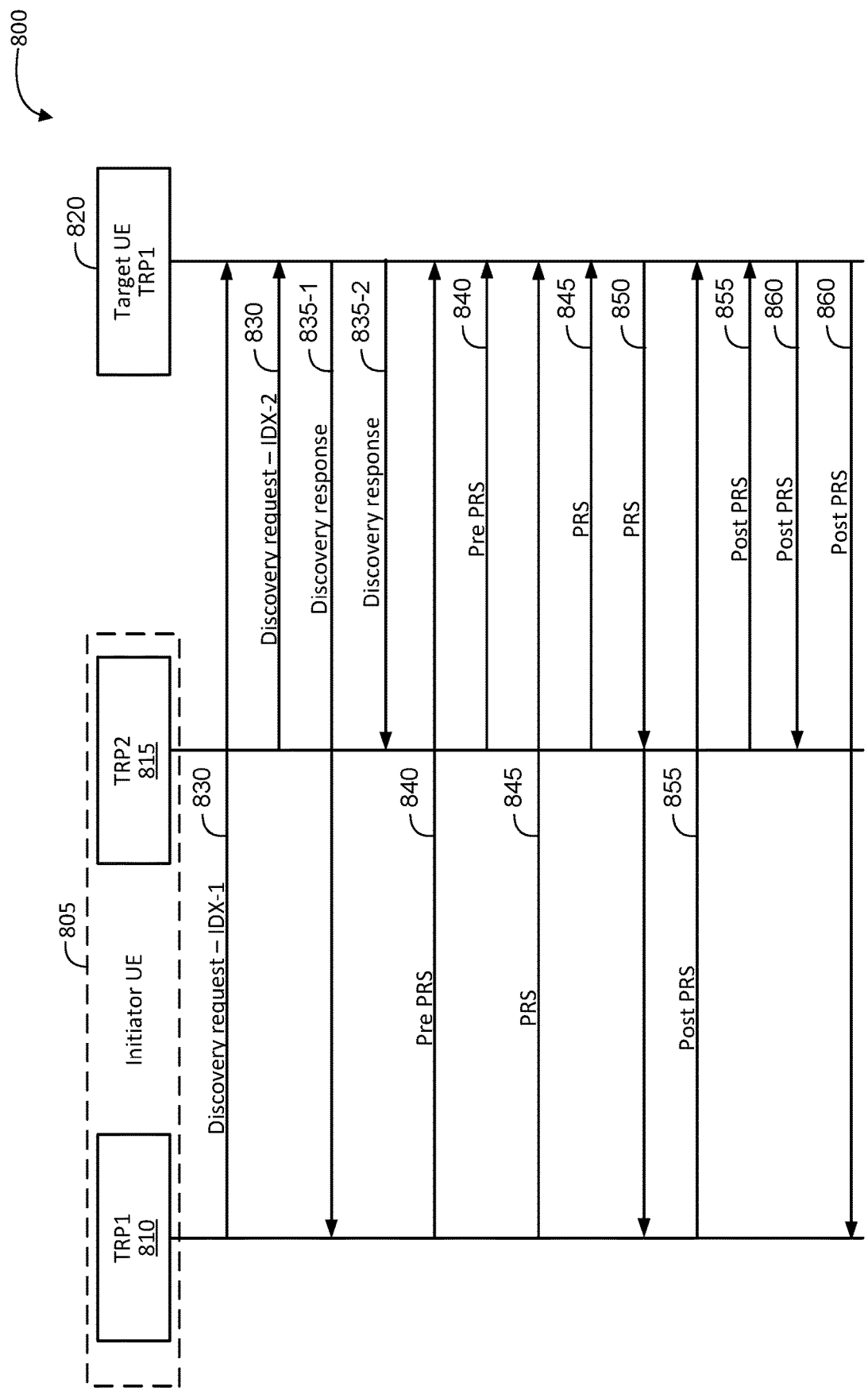
FIG. 8 is a signal flow diagram illustrating an embodiment of a method of performing SL positioning between an initiator UE, having a first TRP and a second TRP, and a target UE having a single TRP.

FIG. 8 comprises a signal flow diagram, illustrating an embodiment of a method 800 of performing SL positioning between an initiator UE 805, having a first TRP 810 and a second TRP 815, and a target UE 820 having a single TRP. This set up may reflect the scenario 500B of FIG. 5B, for example.

The method 800 may begin at operations 830, in which each TRPs 810 and 815 of initiator UE 805 sends a discovery request to the target UE 820. Because the initiator UE 805 may be a higher-release UE (e.g., capable of SL positioning with mTRP UEs), it can act as such, rather than transmitting discovery requests in accordance with lower releases. With this in mind, the discovery requests sent at operation 830 may be such that (i) a lower-release target UEs can understand the discovery request, and (ii) a higher-release (mTRP-capable) target UE can understand the higher capability of the Initiator UE 805 from the discovery requests. As such, according to some embodiments, the first TRP 810 and second TRP 815 can each include an index or other identifier (e.g., within an identifier of the respective TRP) that indicates to the target UE 820 that the separate discovery requests received at operation 830 are sent from different TRPs of the initiator UE 805. As shown in FIG. 8, the discovery request from the first TRP 810 includes an index "IDX-1" and the discovery request from the second TRP 815 includes an index "IDX-2." In this way, the target UE 820, if it is mTRP-capable, can correlate each discovery request to a corresponding TRP.

Figure 9:
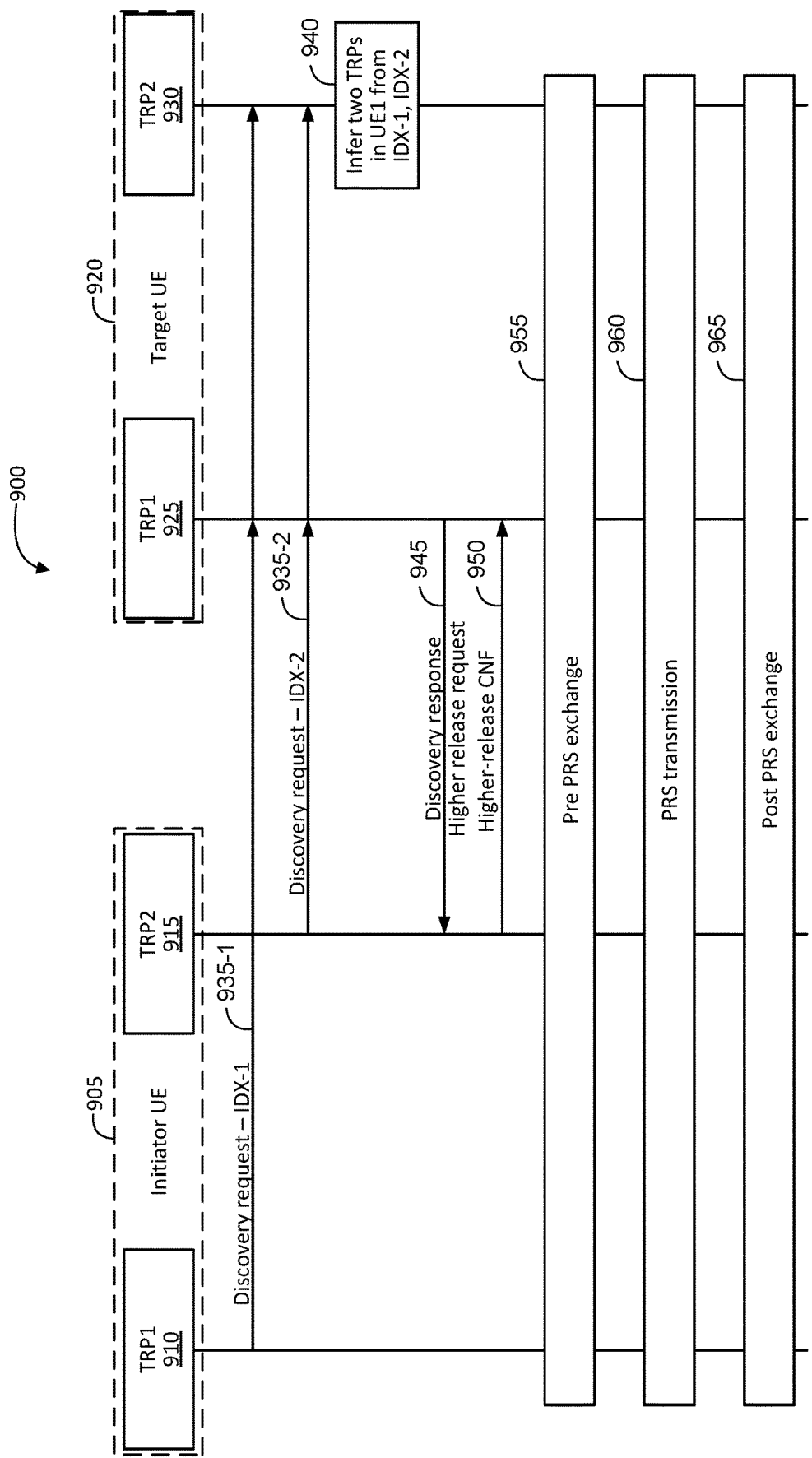
FIG. 9 is a signal flow diagram illustrating an embodiment of a method of performing SL positioning between an initiator UE, having a first TRP and a second TRP, and a target UE having a first TRP and the second TRP.

To enable this functionality, a common "base ID" can be used. For example, a higher-release target UE can identify a common base ID (e.g., "IDX") from each of the discovery requests, indicating that each discovery request is coming from a common initiator UE. Because the base IDs have different extensions (e.g., "–1" and "–2", which may represent bits of a TRP identifier that are used—in higher-release UEs—for extension information), a higher-release target UE can identify and distinguish discovery requests from each transmitting TRP. (An example of this is shown in FIG. 9 and described hereafter.)

However, if the target UE 820 comprises a lower-release (single TRP-capable) UE, discovery requests will simply be treated as being transmitted by different initiator UEs. That is, a lower-release UE will not recognize a common base ID with different extensions, but may simply recognize that the identifier in each discovery request is different. Thus, a lower-release target UE 820 will consider each discovery message to be from a different initiator UE. The method 800 of FIG. 8 illustrates an example method of a target UE 820 comprising a lower-release UE.

Continuing with the method 800, the target UE 820 in this case comprises a single TRP-capable UE. And as such, it will separately respond to each discovery request sent at operation 830 as if the first TRP 810 and second TRP 815 of the initiator UE 805 are separate UEs. Thus, it will send a first discovery response, at operation 835-1, to first TRP 810, and a second discovery response, at operation 835-2, to the second TRP 815. The rest of the method may then continue as if the first TRP 810 and second TRP 815 are separate UEs, where each TRP sends a respective pre-PRS message at operations 840, transmits a respective PRS at operations 845 and receives PRS from the target UE 820 at operation 850. Further, each TRP 810 and 815 can exchanged post PRS information with the target UE 820, as indicated at operations 855 and 860.

In one case, RSU informs UEs about the presence of only lower release UE in a geography. Upon receiving this information, the initiator UE uses a single TRP and behaves like a single TRP UE.

In one case, there is a pre configuration provided to all UEs (e.g., based on geography) as to the capability/release the UE is supposed to adhere. In a first location, the initiator UE behaves as a lower release UE, and in the second location, the initiator UE behaves as a higher release UE.

FIG. 9 comprises a signal flow diagram illustrating an embodiment of a method 900 of performing SL positioning between an initiator UE 905, having a first TRP 910 and a second TRP 915, and a target UE 920 having a first TRP 925 and the second TRP 930. Thus, both initiator UE 905 and target UE 920 may comprise mTRP UEs comprising higher-release UEs capable of performing SL positioning with other mTRP UEs.

The method 800 may begin at operations 935-1 and 935-2, in which the first TRP 910 and second TRP 915 of the initiator UE 905 respectively transmit discovery requests. Similar to the method 800 of FIG. 8, the discovery requests here may include identifiers for TRPs 910 and 915 in a formatting that indicates to higher-release target UEs that each TRP 910 and 915 belongs to a common initiator UE 905. Because the target UE 920 is mTRP capable, it can recognize that the discovery requests sent in operations 935 belong to two separate TRPs of a single initiator UE 905. This inference by the target UE 920 is shown in method 900 at operation 940.

At that point, the rest of the method 900 may proceed in accordance with mTRP positioning protocols. For example, communications between target UE 920 and initiator UE 905 may be conducted in accordance with higher-release protocols, and may include formatting and content in accordance with such protocols. Moreover, non-PRS communications between initiator UE 905 and target UE 920 may be consolidated to a single TRP. As shown in FIG. 9, this can include providing a discovery response to a higher release request, as indicated at operation 945, which can include an indication to the initiator UE 905 that the target UE 920 is mTRP capable. The initiator UE 905 can then send the target UE 920 a higher-release confirmation (CNF), as shown at operation 950.

Pre-PRS exchange at operation 955, PRS transmission at operation 960, and post PRS exchange at operation 965 can each proceed in accordance with relevant mTRP protocols. (To avoid clutter, these operations have been represented by blocks rather than individual arrows.) This may include one or more of consolidation of information exchange between each UE to a single TRP, transmitting PRS from each TRP, measuring each transmitted PRS with each TRP, or any combination thereof.

According to some embodiments, an mTRP-capable UE may perform in accordance with higher-release functionality based on different factors. That is, depending on one or more factors, a higher-release UE having more than one TRP may perform any of the functionality illustrated in FIGS. 6-9, performing as a single TRP-capable UE in some circumstances, and performing as an mTRP in other circumstances. Geography, for example, may be one such factor. For instance, a mTRP-capable UE—either as an initiator UE or as a target UE—may perform as a single TRP-capable UE in some locations, and perform as an mTRP-capable UE in other circumstances.

Figure 10:
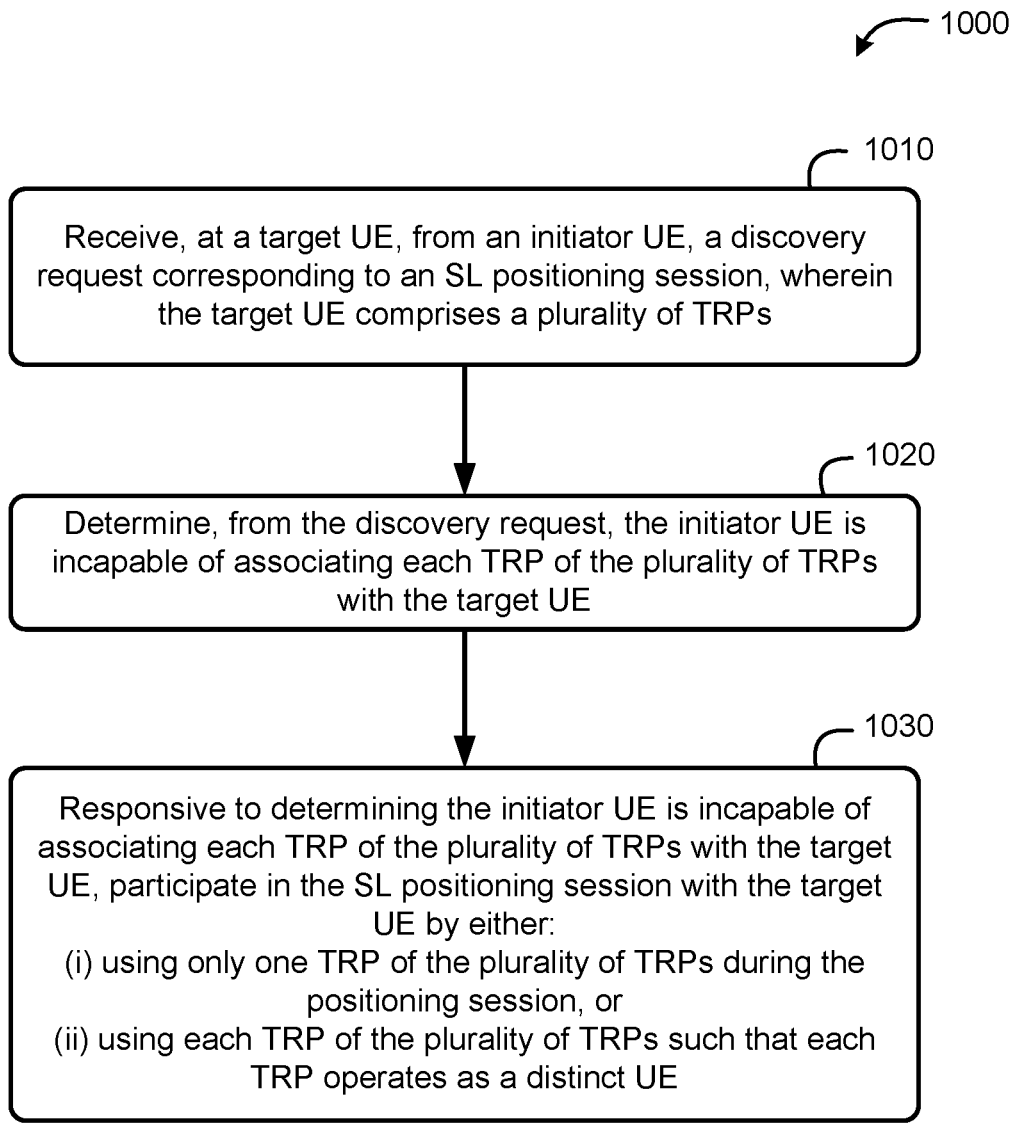
FIG. 10 is a flow diagram of a first method of performing SL positioning, according to an embodiment.

FIG. 10 is a flow diagram of a method 1000 of performing SL positioning, according to an embodiment. Aspects of the method 1000 may reflect functionality of a target UE as described with respect to FIG. 7, for example. Means for performing the functionality illustrated in one or more of the blocks shown in FIG. 10 may be performed by hardware and/or software components of a UE (e.g., a target UE as described in the embodiments herein). Example components of a UE are illustrated in FIG. 13, which is described in more detail hereafter.

At block 1010, the functionality comprises receiving, at a target UE from an initiator UE (e.g., via an SL interface), a discovery request corresponding to an SL positioning session, wherein the target UE comprises a plurality of TRPs. As noted herein, the discovery request received from an initiator UE may be indicative of a release of the initiator UE and a corresponding capability of the initiator UE of performing a positioning session with a target UE having multiple TRPs. Means for performing functionality at block 1010 may comprise a bus 1305, processor 1310, digital signal processor (DSP) 1320, wireless communication interface 1330, memory 1360, and/or other components of a UE 1300, as illustrated in FIG. 13.

At block 1020, the functionality comprises determining, from the discovery request, the initiator UE is incapable of associating each TRP of the plurality of TRPs with the target UE. As noted with respect to FIG. 7, this determination may be based on an explicit flag and/or a release number. As such, according to some embodiments of the method 1000, determining the initiator UE is incapable of associating each TRP of the plurality of TRPs with the target UE is based on the discovery request comprising an indication that the initiator UE uses a release of a wireless standard incapable of multiple TRP (mTRP) positioning, a flag indicating the initiator UE is incapable of mTRP positioning, or any combination thereof.

Figure 13:
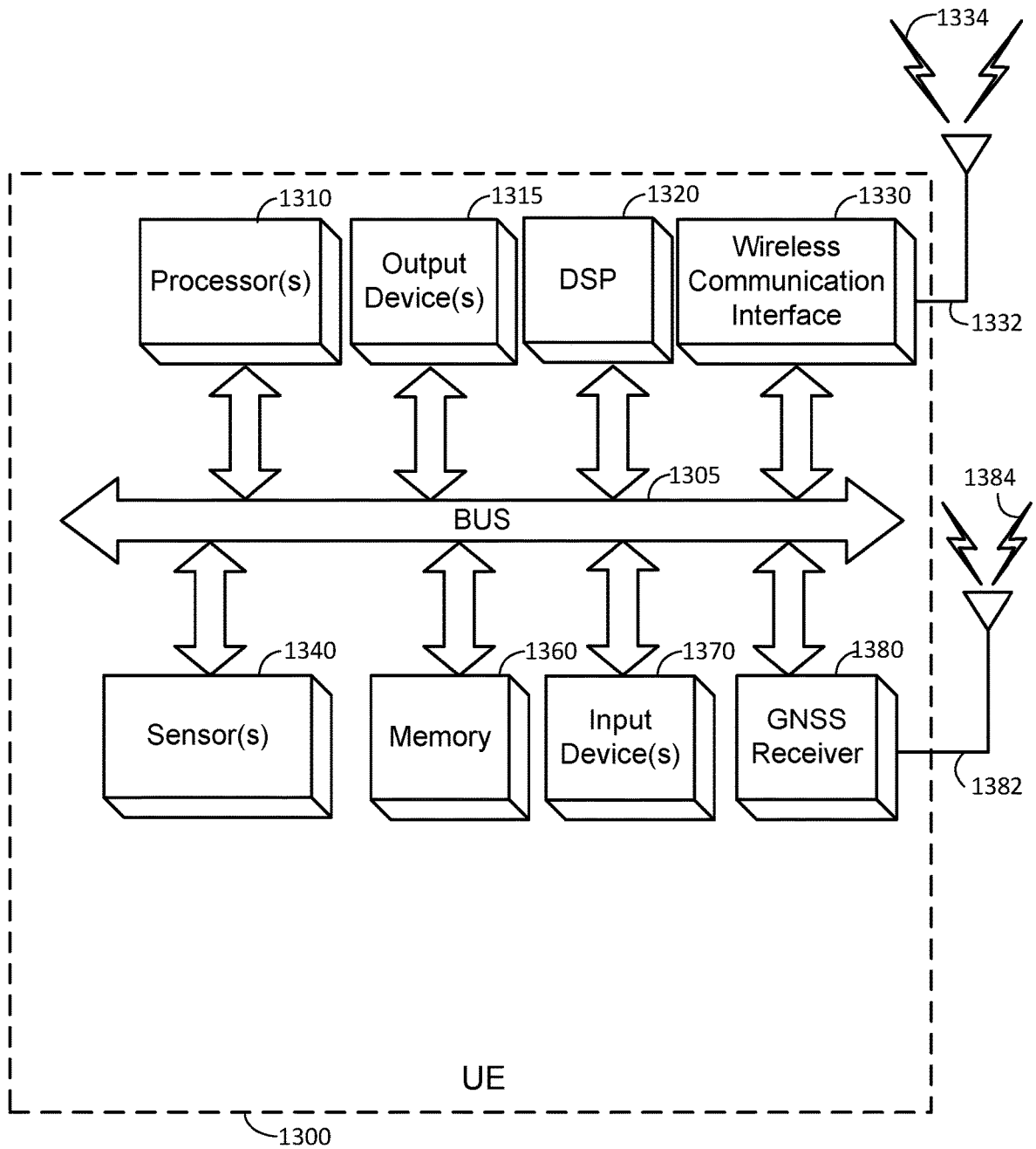
FIG. 13 is a block diagram of an embodiment of a UE.

Means for performing functionality at block 1020 may comprise a bus 1305, processor 1310, DSP 1320, wireless communication interface 1330, memory 1360, and/or other components of a UE 1300, as illustrated in FIG. 13.

At block 1030, the functionality comprises, responsive to determining the initiator UE is incapable of associating each TRP of the plurality of TRPs with the target UE, participating in the SL positioning session with the target UE by either (i) using only one TRP of the plurality of TRPs during the positioning session, or (ii) using each TRP of the plurality of TRPs such that each TRP operates as a distinct UE. As noted previously herein, this response can help ensure backward compatibility with an initiator UE that is incapable of performing a positioning session with a target UE having multiple TRPs. According to some embodiments, using each TRP of the plurality of TRPs such that each TRP operates as a distinct UE may comprise sending, from each TRP of the plurality of TRPs pre-positioning reference signal (PRS) information, a PRS, post-PRS information, or any combination thereof.

As described herein, when utilizing only one TRP, different embodiments may do so in different ways. For example, according to some embodiments, utilizing only one TRP of the plurality of TRPs during the positioning session may comprise using the one TRP to send pre-positioning reference signal (PRS) information, a PRS, post-PRS information, or any combination thereof. Such embodiments may further comprise selecting, with the target UE, the one TRP from the plurality of TRPs based on a time at which the one TRP receives a PRS from the initiator UE, a determination the one TRP has an unobstructed line of sight with the initiator UE, a power consumption of the one TRP, or any combination thereof. Moreover, according to some embodiments, the determination the one TRP has an unobstructed line of sight with the initiator UE may be based on sensor information from one or more sensors of the target UE. Additionally or alternatively, embodiments may comprise including, in the post-PRS information, information indicative of a time of arrival at which PRS from the initiator UE was received at the target UE, wherein the time of arrival comprises an earliest time at which a PRS from the initiator UE arrived at any of the TRPs of the plurality TRPs, an mean or average time at which a PRS from the initiator UE arrived at each TRP of the plurality TRPs, or a time at which a PRS from the initiator UE arrived at the one TRP.

Means for performing functionality at block 1030 may comprise a bus 1305, processor 1310, DSP 1320, wireless communication interface 1330, memory 1360, and/or other components of a UE 1300, as illustrated in FIG. 13.

Figure 11:
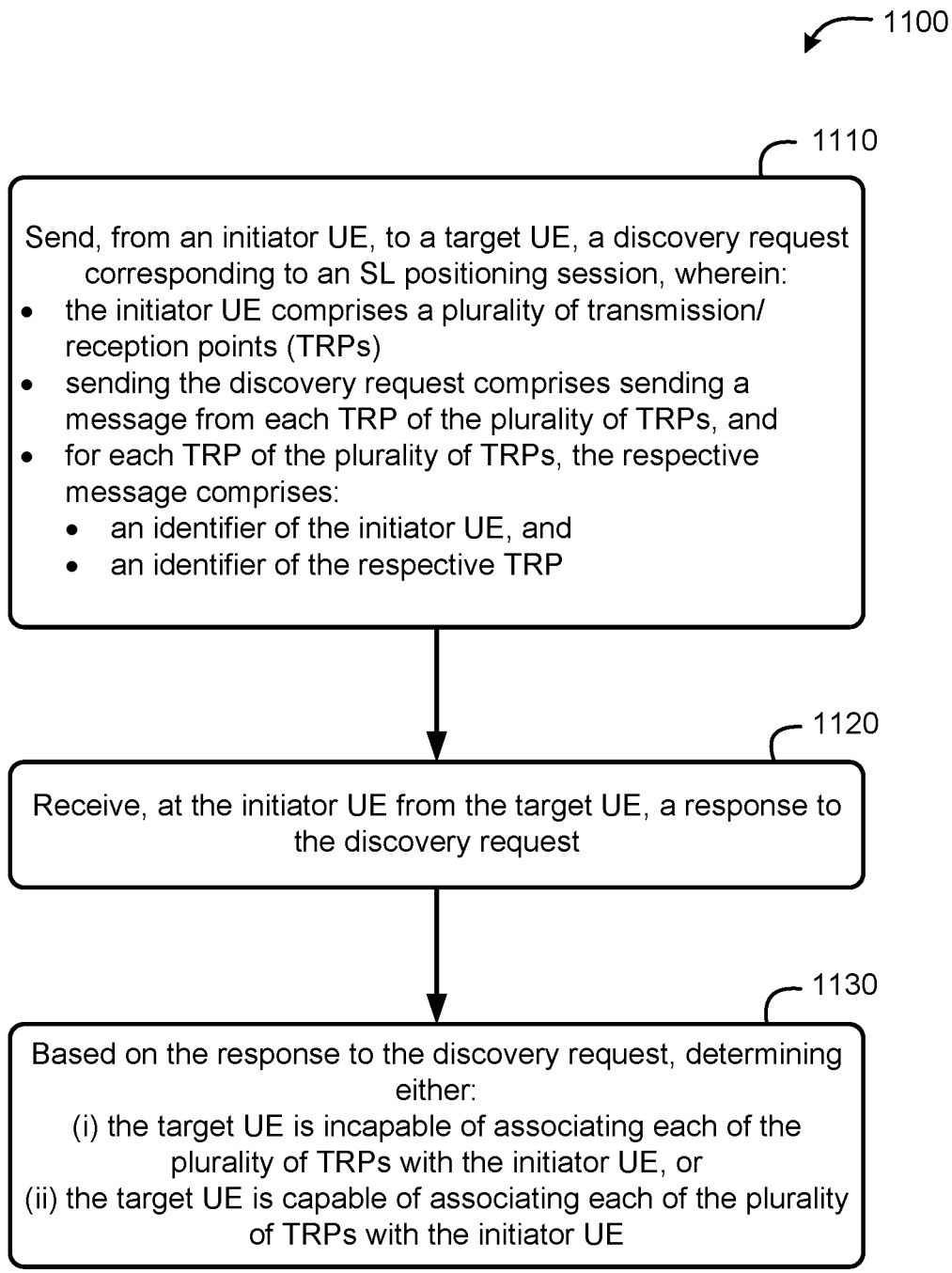
FIG. 11 is a flow diagram of a second method of performing SL positioning, according to an embodiment.

FIG. 11 is a flow diagram of another method 1100 of performing SL positioning, according to an embodiment. Aspects of the method 1100 may reflect functionality of an initiator UE as described with respect to FIG. 8, for example. Means for performing the functionality illustrated in one or more of the blocks shown in FIG. 11 may be performed by hardware and/or software components of a UE (e.g., an initiator UE as described in the embodiments herein). Example components of a UE are illustrated in FIG. 13, which is described in more detail hereafter.

At block 1110, the functionality comprises sending from an initiator UE to a target UE (e.g., via an SL interface), a discovery request corresponding to an SL positioning session, wherein the initiator UE comprises a plurality of transmission/reception points (TRPs), sending the discovery request comprises sending a message from each TRP of the plurality of TRPs, and for each TRP of the plurality of TRPs, the respective message comprises (i) an identifier of the initiator UE and (ii) an identifier of the respective TRP. As described with regard to FIG. 8, according to some embodiments, the identifier of the initiator UE and the identifier of the respective TRP can both be embedded in an identifier field within the discovery request. For example, in higher-release standards, a first portion of the bits for the identifier may be dedicated as a "base ID" that identifies the UE, and a second portion of the bits for the identifier may be dedicated as an "extension" that serves as a TRP identifier. (The base ID is represented as "IDX" in FIG. 8, and the extensions are represented as "-1" and "-2".) Thus, according to some embodiments of the method 1100, for each TRP of the plurality of TRPs, the identifier of the initiator UE and the identifier of the respective TRP may both be included in a UE identification field.

Means for performing functionality at block 1110 may comprise a bus 1305, processor 1310, digital signal processor (DSP) 1320, wireless communication interface 1330, memory 1360, and/or other components of a UE 1300, as illustrated in FIG. 13.

At block 1120, the functionality comprises, receiving, at the initiator UE from the target UE, a response to the discovery request. This may be in accordance with standard discovery protocol, and, as described herein, the content and/or format of the response to the discovery request may be indicative of whether the target UE is capable of performing a positioning session with a initiator UE having a plurality of TRPs. Means for performing functionality at block 1120 may comprise a bus 1305, processor 1310, DSP 1320, wireless communication interface 1330, memory 1360, and/or other components of a UE 1300, as illustrated in FIG. 13.

At block 1130, the functionality comprises, based on the response to the discovery request, determining either (i) the target UE is incapable of associating each of the plurality of TRPs with the initiator UE, or (ii) the target UE is capable of associating each of the plurality of TRPs with the initiator UE. Means for performing functionality at block 1130 may comprise a bus 1305, processor 1310, DSP 1320, wireless communication interface 1330, memory 1360, and/or other components of a UE 1300, as illustrated in FIG. 13.

As described in the embodiments herein, an initiator UE may subsequently behave in different ways depending on the determination made at block 1130. For example, the method 1100 may further comprise, responsive to determining the target UE is incapable of associating each of the plurality of TRPs with the initiator UE, participating in the SL positioning session by using each TRP of the plurality of TRPs such that each TRP operates as a distinct UE. In such instances, using each TRP of the plurality of TRPs such that each TRP operates as a distinct UE may comprise sending, from each TRP of the plurality of TRPs pre-positioning reference signal (PRS) information, a PRS, post-PRS information, or any combination thereof. According to some embodiments, determining the target UE is incapable of associating each of the plurality of TRPs with the initiator UE may be based on the response to the discovery request comprising a response message to each TRP of the plurality of TRPs. Additionally or alternatively, embodiments of the method 1100 may further comprise, responsive to determining the target UE is capable of associating each of the plurality of TRPs with the initiator UE, participating in the SL positioning session by consolidating TRP information of the plurality of TRPs, the TRP information comprising pre-PRS information, post-PRS information, or any combination thereof. According to some embodiments, determining the target UE is capable of associating each of the plurality of TRPs with the initiator UE may be based on the response to the discovery request that comprises an acknowledgment of each TRP of the plurality of TRPs, an indication that the target UE uses a release of a wireless standard capable of multiple TRP (mTRP) positioning, or any combination thereof.

Figure 12:
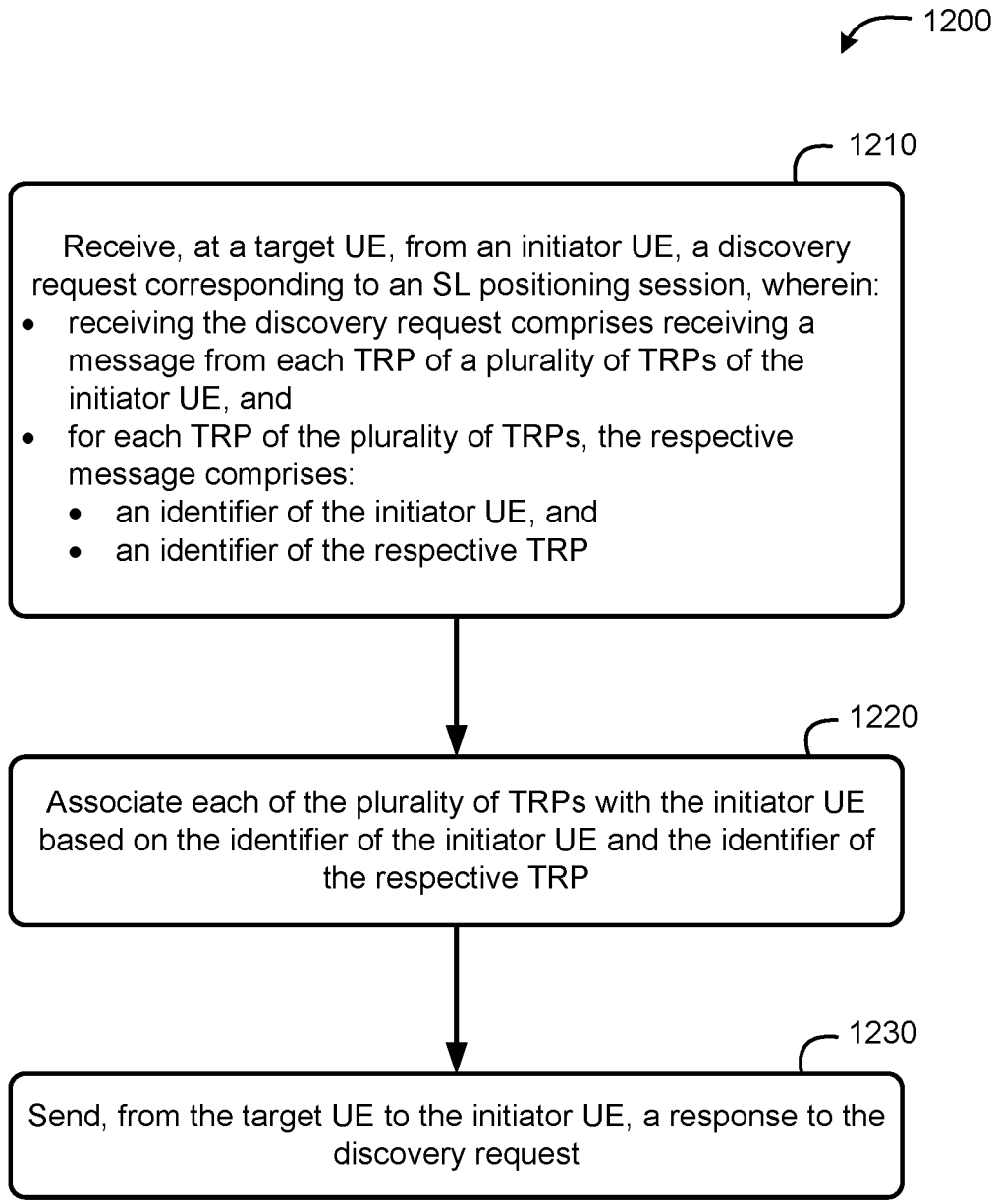
FIG. 12 is a flow diagram of a third method of performing SL positioning, according to an embodiment.

FIG. 12 is a flow diagram of another method 1200 of performing SL positioning, according to an embodiment. Aspects of the method 1200 may reflect functionality of a target UE as described with respect to FIG. 9, for example. Means for performing the functionality illustrated in one or more of the blocks shown in FIG. 12 may be performed by hardware and/or software components of a UE (e.g., a target UE as described in the embodiments herein). Example components of a UE are illustrated in FIG. 13, which is described in more detail hereafter.

At block 1210, the functionality comprises receiving at a target UE from an initiator UE (e.g., via an SL interface), a discovery request corresponding to an SL positioning session, wherein receiving the discovery request comprises receiving a message from each TRP of a plurality of TRPs of the initiator UE, and for each TRP of the plurality of TRPs, the respective message comprises (i) an identifier of the initiator UE, and (ii) an identifier of the respective TRP. Again, as described elsewhere herein, according to some embodiments, the identifier of the initiator UE and the identifier of the respective TRP can both be embedded in an identifier field within the discovery request. For example, in higher-release standards, a first portion of the bits for the identifier may be dedicated as a "base ID" that identifies the UE, and a second portion of the bits for the identifier may be dedicated as an "extension" that serves as a TRP identifier. (The base ID is represented as "IDX" in FIG. 9, and the extensions are represented as "−1" and "−2".)

Means for performing functionality at block 1210 may comprise a bus 1305, processor 1310, digital signal processor (DSP) 1320, wireless communication interface 1330, memory 1360, and/or other components of a UE 1300, as illustrated in FIG. 13.

At block 1220, the functionality comprises associating each of the plurality of TRPs with the initiator UE based on the identifier of the initiator UE and the identifier of the respective TRP. This association may be a form of recognizing, by the target UE, that the plurality of TRPs belong to the initiator UE. According to some embodiments, subsequent communications to the initiator UE therefore may be consolidated. Means for performing functionality at block 1220 may comprise a bus 1305, processor 1310, DSP 1320, wireless communication interface 1330, memory 1360, and/or other components of a UE 1300, as illustrated in FIG. 13.

At block 1230, the functionality comprises sending, from the target UE to the initiator UE (e.g., via the SL interface), a response to the discovery request. As described with respect to FIG. 9, this may comprise sending a request to the initiator UE to engage in higher-release positioning (e.g., in which both TRPs of the initiator UE are recognized as such, and communications between UEs may be consolidated as described herein). According to some embodiments, sending the response to the discovery request may comprise sending an acknowledgment of each TRP of the plurality of TRPs, an indication that the target UE uses a release of a wireless standard capable of multiple TRP (mTRP) positioning, or any combination thereof. According to some embodiments, the target UE may comprise a second plurality of TRPs, in which case sending the response to the discovery request may comprise sending the response using a single TRP of the second plurality of TRPs. In embodiments in which the target UE comprises a second plurality of TRPs, participating in the SL positioning session may comprise consolidating TRP information from the second plurality of TRPs, where TRP information comprises pre-PRS information, post-PRS information, or any combination thereof.

Means for performing functionality at block 1230 may comprise a bus 1305, processor 1310, DSP 1320, wireless communication interface 1330, memory 1360, and/or other components of a UE 1300, as illustrated in FIG. 13.

FIG. 13 is a block diagram of an embodiment of a UE 1300, which can be utilized as described herein above (e.g., in association with the previously-described figures). The UE may therefore correspond with and/or be incorporated into mobile device 105 of FIG. 1, UE 205 of FIG. 2, and/or any other UE described herein, including initiator UEs and/or target UEs. It should be noted that FIG. 13 is meant only to provide a generalized illustration of various components, any or all of which may be utilized as appropriate. Furthermore, the functionality of the UE discussed herein may be executed by one or more of the hardware and/or software components illustrated in FIG. 13.

The UE 1300 is shown comprising hardware elements that can be electrically coupled via a bus 1305 (or may otherwise be in communication, as appropriate). The hardware elements may include a processor(s) 1310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1310 may comprise one or more processing units, which may be housed in a single integrated circuit (IC) or multiple ICs. As shown in FIG. 13, some embodiments may have a separate DSP 1320, depending on desired functionality. Location determination and/or other determinations based on wireless communication may be provided in the processor(s) 1310 and/or wireless communication interface 1330 (discussed below). The UE 1300 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 1300 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1300 to communicate with other devices as described in the embodiments above. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1300 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000@, wideband code division multiple access (WCDMA), and so on. CDMA2000@includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1300 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1300 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the UE 1300, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1310, DSP 1320, and/or a processor within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1310 or DSP 1320.

The UE 1300 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like.

Such storage devices may be configured to implement any appropriate data stores, including without limitation, various file systems, database structures, and/or the like.

The memory 1360 of the UE 1300 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 1300 (and/or processor(s) 1310 or DSP 1320 within UE 1300). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of performing sidelink (SL) positioning, the method comprising: receiving, at a target user equipment (UE), from an initiator UE, a discovery request corresponding to an SL positioning session, wherein the target UE comprises a plurality of transmission/reception points (TRPs); determining, from the discovery request, the initiator UE is incapable of associating each TRP of the plurality of TRPs with the target UE; and responsive to determining the initiator UE is incapable of associating each TRP of the plurality of TRPs with the target UE, participating in the SL positioning session with the target UE by either: (i) using only one TRP of the plurality of TRPs during the SL positioning session, or (ii) using each TRP of the plurality of TRPs such that each TRP operates as a distinct UE.

Clause 2. The method of clause 1, wherein determining the initiator UE is incapable of associating each TRP of the plurality of TRPs with the target UE is based on the discovery request comprising: an indication that the initiator UE uses a release of a wireless standard incapable of multiple TRP (mTRP) positioning, a flag indicating the initiator UE is incapable of mTRP positioning, or any combination thereof.

Clause 3. The method of any one of clauses 1-2 wherein using only one TRP of the plurality of TRPs during the SL positioning session comprises using the one TRP to send:

pre-positioning reference signal (PRS) information, a PRS, post-PRS information, or any combination thereof.

Clause 4. The method of clause 3 further comprising selecting, with the target UE, the one TRP from the plurality of TRPs based on: a time at which the one TRP receives a PRS from the initiator UE, a determination the one TRP has an unobstructed line of sight with the initiator UE, a power consumption of the one TRP, or any combination thereof.

Clause 5. The method of clause 4 wherein the determination the one TRP has an unobstructed line of sight with the initiator UE is based on sensor information from one or more sensors of the target UE.

Clause 6. The method of clause 3 further comprising including, in the post-PRS information, information indicative of a time of arrival at which PRS from the initiator UE was received at the target UE, wherein the time of arrival comprises: an earliest time at which a PRS from the initiator UE arrived at any of the TRPs of the plurality TRPs, an mean or average time at which a PRS from the initiator UE arrived at each TRP of the plurality TRPs, or a time at which a PRS from the initiator UE arrived at the one TRP.

Clause 7. The method of any one of clauses 1-6 wherein using each TRP of the plurality of TRPs such that each TRP operates as a distinct UE comprises sending, from each TRP of the plurality of TRPs: pre-positioning reference signal (PRS) information, a PRS, post-PRS information, or any combination thereof.

Clause 8. A method of performing sidelink (SL) positioning, the method comprising: sending, from an initiator user equipment (UE), to a target user equipment (UE), a discovery request corresponding to an SL positioning session, wherein: the initiator UE comprises a plurality of transmission/reception points (TRPs); sending the discovery request comprises sending a message from each TRP of the plurality of TRPs; and for each TRP of the plurality of TRPs, the respective message comprises: an identifier of the initiator UE, and an identifier of the respective TRP; receiving, at the initiator UE from the target UE, a response to the discovery request; and based on the response to the discovery request, determining either: the target UE is incapable of associating each of the plurality of TRPs with the initiator UE, or the target UE is capable of associating each of the plurality of TRPs with the initiator UE.

Clause 9. The method of clause 8, wherein, for each TRP of the plurality of TRPs, the identifier of the initiator UE and the identifier of the respective TRP are both included in a UE identification field.

Clause 10. The method of any one of clauses 8-9 further comprising, responsive to determining the target UE is incapable of associating each of the plurality of TRPs with the initiator UE, participating in the SL positioning session by using each TRP of the plurality of TRPs such that each TRP operates as a distinct UE.

Clause 11. The method of clause 10 wherein using each TRP of the plurality of TRPs such that each TRP operates as a distinct UE comprises sending, from each TRP of the plurality of TRPs: pre-positioning reference signal (PRS) information, a PRS, post-PRS information, or any combination thereof.

Clause 12. The method of clause 10 wherein determining the target UE is incapable of associating each of the plurality of TRPs with the initiator UE is based on the response to the discovery request comprising a response message to each TRP of the plurality of TRPs.

Clause 13. The method of clause 8 further comprising, responsive to determining the target UE is capable of associating each of the plurality of TRPs with the initiator UE, participating in the SL positioning session by consolidating TRP information of the plurality of TRPs, the TRP information comprising pre-PRS information, post-PRS information, or any combination thereof.

Clause 14. The method of clause 13 wherein determining the target UE is capable of associating each of the plurality of TRPs with the initiator UE is based on the response to the discovery request comprising: an acknowledgment of each TRP of the plurality of TRPs, an indication that the target UE uses a release of a wireless standard capable of multiple TRP (mTRP) positioning, or any combination thereof.

Clause 15. A method of performing sidelink (SL) positioning, the method comprising: receiving, at a target user equipment (UE), from an initiator UE, a discovery request corresponding to an SL positioning session, wherein: receiving the discovery request comprises receiving a message from each transmission/reception point (TRP) of a plurality of TRPs of the initiator UE; and for each TRP of the plurality of TRPs, the respective message comprises: an identifier of the initiator UE, and an identifier of the respective TRP; associating each of the plurality of TRPs with the initiator UE based on the identifier of the initiator UE and the identifier of the respective TRP; and sending, from the target UE to the initiator UE, a response to the discovery request.

Clause 16. The method of clause 15, wherein sending the response to the discovery request comprises sending: an acknowledgment of each TRP of the plurality of TRPs, an indication that the target UE uses a release of a wireless standard capable of multiple TRP (mTRP) positioning, or any combination thereof.

Clause 17. The method of any one of clauses 15-16 wherein the target UE comprises a second plurality of TRPs, and wherein sending the response to the discovery request comprises sending the response using a single TRP of the second plurality of TRPs.

Clause 18. The method of clause 17 further comprising, participating in the SL positioning session by consolidating TRP information from the second plurality of TRPs, the TRP information comprising pre-PRS information, post-PRS information, or any combination thereof.

Clause 19. A target user equipment (UE) for performing sidelink (SL) positioning, the target UE comprising: a transceiver; a memory; and one or more processors communicatively coupled with the transceiver and the memory, wherein the one or more processors are configured to: receive, via the transceiver, from an initiator UE, a discovery request corresponding to an SL positioning session, wherein the target UE comprises a plurality of transmission/reception points (TRPs); determine, from the discovery request, the initiator UE is incapable of associating each TRP of the plurality of TRPs with the target UE; and responsive to determining the initiator UE is incapable of associating each TRP of the plurality of TRPs with the target UE, participate in the SL positioning session with the target UE by either: (i) using only one TRP of the plurality of TRPs during the SL positioning session, or (ii) using each TRP of the plurality of TRPs such that each TRP operates as a distinct UE.

Clause 20. The target UE of clause 19, wherein the one or more processors are configured to determine the initiator UE is incapable of associating each TRP of the plurality of TRPs with the target UE based on the discovery request comprising: an indication that the initiator UE uses a release of a wireless standard incapable of multiple TRP (mTRP) positioning, a flag indicating the initiator UE is incapable of mTRP positioning, or any combination thereof.

Clause 21. The target UE of any one of clauses 19-20 wherein, to use only one TRP of the plurality of TRPs during the SL positioning session, the one or more processors are configured to use the one TRP to send pre-positioning reference signal (PRS) information, a PRS, post-PRS information, or any combination thereof.

Clause 22. The target UE of clause 21 wherein the one or more processors are further configured to select the one TRP from the plurality of TRPs based on: a time at which the one TRP receives a PRS from the initiator UE, a determination the one TRP has an unobstructed line of sight with the initiator UE, a power consumption of the one TRP, or any combination thereof.

Clause 23. The target UE of clause 22 wherein the one or more processors are further configured to perform the determination the one TRP has an unobstructed line of sight with the initiator UE based on sensor information from one or more sensors.

Clause 24. The target UE of clause 21 wherein the one or more processors are further configured to include, in the post-PRS information, information indicative of a time of arrival at which PRS from the initiator UE was received at the target UE, wherein the time of arrival comprises: an earliest time at which a PRS from the initiator UE arrived at any of the TRPs of the plurality TRPs, an mean or average time at which a PRS from the initiator UE arrived at each TRP of the plurality TRPs, or a time at which a PRS from the initiator UE arrived at the one TRP.

Clause 25. The target UE of any one of clauses 19-24 wherein, to use each TRP of the plurality of TRPs such that each TRP operates as a distinct UE, the one or more processors are configured to send, from each TRP of the plurality of TRPs pre-positioning reference signal (PRS) information, a PRS, post-PRS information, or any combination thereof.

Clause 26. A initiator user equipment (UE) for performing sidelink (SL) positioning, the initiator UE comprising: a transceiver; a memory; and one or more processors communicatively coupled with the transceiver and the memory, wherein the one or more processors are configured to: send, via the transceiver, to a target UE, a discovery request corresponding to an SL positioning session, wherein: the initiator UE comprises a plurality of transmission/reception points (TRPs); wherein, to send the discovery request, the one or more processors are configured to send a message from each TRP of the plurality of TRPs; and for each TRP of the plurality of TRPs, the respective message comprises: an identifier of the initiator UE, and an identifier of the respective TRP; receive, via the transceiver, from the target UE, a response to the discovery request; and determine either: the target UE is incapable of associating each of the plurality of TRPs with the initiator UE, or the target UE is capable of associating each of the plurality of TRPs with the initiator UE.

Clause 27. The initiator UE of clause 26, wherein the one or more processors are further configured to include, in a UE identification field, both the identifier of the initiator UE and the identifier of the respective TRP, for each TRP of the plurality of TRPs.

Clause 28. The initiator UE of any one of clauses 26-27 wherein the one or more processors are further configured to, responsive to determining the target UE is incapable of associating each of the plurality of TRPs with the initiator UE, participate in the SL positioning session by using each TRP of the plurality of TRPs such that each TRP operates as a distinct UE.

Clause 29. The initiator UE of clause 28 wherein, to use each TRP of the plurality of TRPs such that each TRP operates as a distinct UE, the one or more processors are configured to send, from each TRP of the plurality of TRPs pre-positioning reference signal (PRS) information, a PRS, post-PRS information, or any combination thereof.

Clause 30. The initiator UE of any one of clauses 28-29 wherein the one or more processors are configured to determine the target UE is incapable of associating each of the plurality of TRPs with the initiator UE based on the response to the discovery request comprising a response message to each TRP of the plurality of TRPs.

Clause 31. The initiator UE of any one of clauses 26-30 wherein the one or more processors are further configured to, responsive to determining the target UE is capable of associating each of the plurality of TRPs with the initiator UE, participate in the SL positioning session by consolidating TRP information of the plurality of TRPs, the TRP information comprising: pre-PRS information, post-PRS information, or any combination thereof.

Clause 32. The initiator UE of clause 31 wherein the one or more processors are configured to determine the target UE is capable of associating each of the plurality of TRPs with the initiator UE based on the response to the discovery request comprising: an acknowledgment of each TRP of the plurality of TRPs, an indication that the target UE uses a release of a wireless standard capable of multiple TRP (mTRP) positioning, or any combination thereof.

Clause 33. A target user equipment (UE) for performing sidelink (SL) positioning, the target UE comprising: a transceiver; a memory; and one or more processors communicatively coupled with the transceiver and the memory, wherein the one or more processors are configured to: receive, via the transceiver, from an initiator UE, a discovery request corresponding to an SL positioning session, wherein: to receive the discovery request, the one or more processors are configured to receive a message from each transmission/reception point (TRP) of a plurality of TRPs of the initiator UE; and for each TRP of the plurality of TRPs, the respective message comprises: an identifier of the initiator UE, and an identifier of the respective TRP; associate each of the plurality of TRPs with the initiator UE based on the identifier of the initiator UE and the identifier of the respective TRP; and send, via the transceiver, to the initiator UE, a response to the discovery request.

Clause 34. The target UE of clause 33, wherein, to send the response to the discovery request, the one or more processors are configured to send: an acknowledgment of each TRP of the plurality of TRPs, an indication that the target UE uses a release of a wireless standard capable of multiple TRP (mTRP) positioning, or any combination thereof.

Clause 35. The target UE of any one of clauses 33-34 wherein the target UE comprises a second plurality of TRPs, and wherein, to send the response to the discovery request, the one or more processors are configured to send the response using a single TRP of the second plurality of TRPs.

Clause 36. The target UE of any one of clauses 33-35 wherein the one or more processors are further configured to participate in the SL positioning session by consolidating TRP information from the second plurality of TRPs, the TRP information comprising: pre-PRS information, post-PRS information, or any combination thereof.

Clause 37. An apparatus having means for performing the method of any one of clauses 1-36.

Clause 38. A non-transitory computer-readable medium storing instructions, the instructions comprising code for performing the method of any one of clauses 1-36.

What is claimed is:

1. A method of performing sidelink (SL) positioning, the method comprising:

receiving, at a target user equipment (UE), from an initiator UE, a discovery request corresponding to an SL positioning session, wherein the target UE comprises a plurality of transmission/reception points (TRPs);

determining, from the discovery request, the initiator UE is incapable of associating each TRP of the plurality of TRPs with the target UE; and responsive to determining the initiator UE is incapable of associating each TRP of the plurality of TRPs with the target UE, participating in the SL positioning session with the target UE by either:
  (i) using only one TRP of the plurality of TRPs during the SL positioning session, or
  (ii) using each TRP of the plurality of TRPs such that each TRP operates as a distinct UE.

2. The method of claim 1, wherein determining the initiator UE is incapable of associating each TRP of the plurality of TRPs with the target UE is based on the discovery request comprising:
  an indication that the initiator UE uses a release of a wireless standard incapable of multiple TRP (mTRP) positioning,
  a flag indicating the initiator UE is incapable of mTRP positioning, or
  any combination thereof.

3. The method of claim 1, wherein using only one TRP of the plurality of TRPs during the SL positioning session comprises using the one TRP to send:
  pre-positioning reference signal (PRS) information,
  a PRS,
  post-PRS information, or
  any combination thereof.

4. The method of claim 3, further comprising selecting, with the target UE, the one TRP from the plurality of TRPs based on:
  a time at which the one TRP receives a PRS from the initiator UE,
  a determination the one TRP has an unobstructed line of sight with the initiator UE,
  a power consumption of the one TRP, or
  any combination thereof.

5. The method of claim 4, wherein the determination the one TRP has an unobstructed line of sight with the initiator UE is based on sensor information from one or more sensors of the target UE.

6. The method of claim 3, further comprising including, in the post-PRS information, information indicative of a time of arrival at which PRS from the initiator UE was received at the target UE, wherein the time of arrival comprises:
  an earliest time at which a PRS from the initiator UE arrived at any of the TRPs of the plurality TRPs,
  an mean or average time at which a PRS from the initiator UE arrived at each TRP of the plurality TRPs, or
  a time at which a PRS from the initiator UE arrived at the one TRP.

7. The method of claim 1, wherein using each TRP of the plurality of TRPs such that each TRP operates as a distinct UE comprises sending, from each TRP of the plurality of TRPs:
  pre-positioning reference signal (PRS) information,
  a PRS,
  post-PRS information, or
  any combination thereof.

8. A target user equipment (UE) for performing sidelink (SL) positioning, the target UE comprising:

a transceiver;
a memory; and
one or more processors communicatively coupled with the transceiver and the memory, wherein the one or more processors are configured to:
  receive, via the transceiver, from an initiator UE, a discovery request corresponding to an SL positioning session, wherein the target UE comprises a plurality of transmission/reception points (TRPs);
  determine, from the discovery request, the initiator UE is incapable of associating each TRP of the plurality of TRPs with the target UE; and
  responsive to determining the initiator UE is incapable of associating each TRP of the plurality of TRPs with the target UE, participate in the SL positioning session with the target UE by either:
    (i) using only one TRP of the plurality of TRPs during the SL positioning session, or
    (ii) using each TRP of the plurality of TRPs such that each TRP operates as a distinct UE.

9. The target UE of claim 8, wherein the one or more processors are configured to determine the initiator UE is incapable of associating each TRP of the plurality of TRPs with the target UE based on the discovery request comprising:
  an indication that the initiator UE uses a release of a wireless standard incapable of multiple TRP (mTRP) positioning,
  a flag indicating the initiator UE is incapable of mTRP positioning, or
  any combination thereof.

10. The target UE of claim 8, wherein, to use only one TRP of the plurality of TRPs during the SL positioning session, the one or more processors are configured to use the one TRP to send:
  pre-positioning reference signal (PRS) information,
  a PRS,
  post-PRS information, or
  any combination thereof.

11. The target UE of claim 10, wherein the one or more processors are further configured to select the one TRP from the plurality of TRPs based on:
  a time at which the one TRP receives a PRS from the initiator UE,
  a determination the one TRP has an unobstructed line of sight with the initiator UE,
  a power consumption of the one TRP, or
  any combination thereof.

12. The target UE of claim 11, wherein the one or more processors are further configured to perform the determination the one TRP has an unobstructed line of sight with the initiator UE based on sensor information from one or more sensors.

13. The target UE of claim 10, wherein the one or more processors are further configured to include, in the post-PRS information, information indicative of a time of arrival at which PRS from the initiator UE was received at the target UE, wherein the time of arrival comprises:
  an earliest time at which a PRS from the initiator UE arrived at any of the TRPs of the plurality TRPs,
  an mean or average time at which a PRS from the initiator UE arrived at each TRP of the plurality TRPs, or
  a time at which a PRS from the initiator UE arrived at the one TRP.

14. The target UE of claim 8, wherein, to use each TRP of the plurality of TRPs such that each TRP operates as a distinct UE, the one or more processors are configured to send, from each TRP of the plurality of TRPs:
  pre-positioning reference signal (PRS) information,
  a PRS,
  post-PRS information, or
  any combination thereof.

\* \* \* \* \*